United States Patent [19]
Eifrig et al.

[11] Patent Number: 6,005,980
[45] Date of Patent: Dec. 21, 1999

[54] MOTION ESTIMATION AND COMPENSATION OF VIDEO OBJECT PLANES FOR INTERLACED DIGITAL VIDEO

[75] Inventors: Robert O. Eifrig; Xuemin Chen; Ajay Luthra, all of San Diego, Calif.

[73] Assignee: General Instrument Corporation, Horsham, Pa.

[21] Appl. No.: 08/897,847

[22] Filed: Jul. 21, 1997

Related U.S. Application Data

[60] Provisional application No. 60/040,120, Mar. 7, 1997, and provisional application No. 60/042,245, Mar. 31, 1997.

[51] Int. Cl.[6] .................................................. G06K 9/34
[52] U.S. Cl. ........................................................ 382/236
[58] Field of Search .................................. 382/232, 236, 382/238, 240, 242, 248, 250; 358/432, 433; 348/384, 394, 395, 400–404, 407–416, 420, 421, 425, 430, 431

[56] References Cited

U.S. PATENT DOCUMENTS 5,793,895  8/1998  Chang et al. ............................ 382/236
5,815,646  9/1998  Purcell et al. ........................... 348/426

*Primary Examiner*—Jose L. Couso
*Attorney, Agent, or Firm*—Barry R. Lipsitz; Ralph F. Hoppin

[57] ABSTRACT

A motion estimation and compensation technique is provided for interlaced digital video such as video object planes (VOPs). Predictor motion vectors for use in differentially encoding a current field coded macroblock are obtained using the median of motion vectors of surrounding blocks or macroblocks. When a surrounding macroblock is itself interlaced coded, an average motion vector for that macroblock is used, with fractional pixel values being mapped to the half-pixel. When the current block is not interlaced coded but a surrounding block is, the field motion vectors may be used individually or averaged. In a repetitive padding technique for an interlaced coded VOP, the even and odd lines of the VOP and surrounding block are grouped. Within each field, exterior pixels are padded by setting them to the value of the nearest boundary pixel, or to an average of two boundary pixels. The lines are then reordered to provide a single padded reference VOP image.

54 Claims, 13 Drawing Sheets

MOTION ESTIMATION AND COMPENSATION OF VIDEO OBJECT PLANES FOR INTERLACED DIGITAL VIDEO

This application claims the benefit of U.S. Provisional Application Ser. No. 60/040,120, filed Mar. 7, 1997, and U.S. Provisional Application Ser. No. 60/042,245, filed Mar. 31, 1997.

BACKGROUND OF THE INVENTION

The present invention relates to a method and apparatus for coding of digital video images such as video object planes (VOPs), and, in particular, to motion estimation and compensation techniques for interlaced digital video. A padding technique for extending the area of an interlaced coded reference VOP is also disclosed.

The invention is particularly suitable for use with various multimedia applications, and is compatible with the MPEG-4 Verification Model (VM) standard described in document ISO/IEC/JTC1/SC29/WG11N1642, entitled "MPEG-4 Video Verification Model Version 7.0", April 1997, incorporated herein by reference. The MPEG-2 standard is a precursor to the MPEG-4 standard, and is described in document ISO/IEC 13818-2, entitled "Information Technology—Generic Coding of Moving Pictures and Associated Audio, Recommendation H.262," Mar. 25, 1994, incorporated herein by reference.

MPEG-4 is a new coding standard which provides a flexible framework and an open set of coding tools for communication, access, and manipulation of digital audiovisual data. These tools support a wide range of features. The flexible framework of MPEG-4 supports various combinations of coding tools and their corresponding functionalities for applications required by the computer, telecommunication, and entertainment (i.e., TV and film) industries, such as database browsing, information retrieval, and interactive communications.

MPEG-4 provides standardized core technologies allowing efficient storage, transmission and manipulation of video data in multimedia environments. MPEG-4 achieves efficient compression, object scalability, spatial and temporal scalability, and error resilience.

The MPEG-4 video VM coder/decoder (codec) is a block- and object-based hybrid coder with motion compensation. Texture is encoded with an 8×8 Discrete Cosine Transformation (DCT) utilizing overlapped block-motion compensation. Object shapes are represented as alpha maps and encoded using a Content-based Arithmetic Encoding (CAE) algorithm or a modified DCT coder, both using temporal prediction. The coder can handle sprites as they are known from computer graphics. Other coding methods, such as wavelet and sprite coding, may also be used for special applications.

Motion compensated texture coding is a well known approach for video coding, and can be modeled as a three-stage process. The first stage is signal processing which includes motion estimation and compensation (ME/MC) and a two-dimensional (2-D) spatial transformation. The objective of ME/MC and the spatial transformation is to take advantage of temporal and spatial correlations in a video sequence to optimize the rate-distortion performance of quantization and entropy coding under a complexity constraint. The most common technique for ME/MC has been block matching, and the most common spatial transformation has been the DCT.

However, special concerns arise for ME/MC of VOPs, particularly when the VOP is itself interlaced coded, and/or uses reference images which are interlaced coded. Moreover, for arbitrarily shaped VOPs which are interlaced coded, special attention must be paid to the area of the reference image used for motion prediction.

Accordingly, it would be desirable to have an efficient technique for ME/MC coding of a VOP which is itself interlaced coded, and/or uses reference images which are interlaced coded. The technique should provide differential encoding of the motion vectors of a block or macroblock of the VOP using motion vectors of neighboring blocks or macroblocks. A corresponding decoder should be provided. It would further be desirable to have an efficient technique for padding the area of a reference image for coding of interlaced VOPs. The present invention provides a system having the above and other advantages.

SUMMARY OF THE INVENTION

In accordance with the present invention, a method and apparatus are presented for motion estimation and motion compensation coding of a video object plane (VOP) or similar video image which is itself interlaced coded, and/or uses reference images which are interlaced coded.

A first method provides horizontal and vertical motion vector components for use in differentially encoding respective horizontal and vertical motion vector components of first and second fields of a current field coded macroblock of a digital video image. Candidate first, second and third blocks near the current macroblock have associated horizontal and vertical motion vector components which can be used for predicting the motion vectors of the current macroblock. The first block immediately precedes the current macroblock of a current row, the second block is immediately above the current macroblock in a preceding row, and the third block immediately follows the second block in the preceding row. Thus, the candidate blocks are in a spatial neighborhood of the current macroblock.

A horizontal motion vector component is selected for use in differentially encoding the horizontal motion vector components of the first and second fields of the current field coded macroblock according to the median of the horizontal motion vector components of the first, second and third candidate blocks. Alternatively, an average or some other weighted function may be used. A vertical motion vector component is determined similarly.

When one of the candidate blocks is a subset of a macroblock, the block which is closest to the upper left-hand portion of the current macroblock is used as the candidate block of that particular macroblock. For example, the candidate block may be an 8×8 block in a 16×16 macroblock.

A second method provides horizontal and vertical motion vector components for use in differentially encoding horizontal and vertical motion vector components, respectively, of a current progressive-predicted or advanced-predicted block of a digital video image. A progressive predicted block may be a 16×16 macroblock. An advanced prediction block uses a combination of 8×8 motion compensation and overlapped block motion compensation. In either case, the current block is not interlaced coded.

Candidate first, second and third blocks have associated horizontal and vertical motion vector components. If at least one of the candidate blocks is a field coded candidate macroblock having first and second fields, then the first and second fields each have corresponding horizontal and vertical motion vector components. A horizontal motion vector component is selected for use in differentially encoding the horizontal motion vector component of the current block according to a value derived from the horizontal motion vector components of the first, second and third candidate blocks.

In particular, the selected horizontal motion vector component may be determined according to a median of the horizontal motion vector components of the candidate blocks, including the corresponding horizontal motion vector components of the first and second fields of the at least one field coded candidate macroblock.

Alternatively, the respective first and second field horizontal motion vector components of the at least one field coded candidate macroblock may be averaged to obtain at least one corresponding averaged horizontal motion vector component. The selected horizontal motion vector component is then determined according to a median of the horizontal motion vector components of the candidate blocks other than the at least one field coded candidate macroblock, if any, and the at least one corresponding averaged horizontal motion vector component.

For example, if all three candidate macroblocks are field (i.e., interlaced) predicted, the horizontal motion vector components of the first and second fields of each candidate macroblock are averaged to obtain three averaged horizontal motion vector components. The selected horizontal motion vector component for differentially encoding the horizontal motion vector component of the current block is then the median of the three averaged motion vector components. A vertical motion vector component is similarly selected.

When first and second field motion vectors of the at least one field coded candidate macroblock are averaged, all fractional pixel offsets are mapped to a half-pixel displacement to provide a better prediction.

In a third method, the current macroblock is field predicted and at least one of the candidate blocks is a field coded macroblock. The selected horizontal motion vector component for use in differentially encoding the horizontal motion vector component of the first field of the current macroblock is determined according to a value derived from (i) the horizontal motion vector components of the candidate blocks other than the at least one field coded candidate macroblock, if any, and (ii) the horizontal motion vector components of the first field of the at least one field coded candidate macroblock. For example, the median may be used. Thus, only the first field of the field predicted candidate macroblock(s) is used. Alternatively, only the second field of the field predicted candidate macroblock(s) can be used to predict the second field of the current macroblock.

In another alternative, the respective first and second field horizontal motion vector components of the at least one field coded candidate macroblock are averaged to obtain at least one corresponding averaged horizontal motion vector component. The selected horizontal motion vector component for use in differentially encoding the horizontal motion vector component(s) of at least one of the first and second fields of the current macroblock is determined according to a median of (i) the horizontal motion vectors of the candidate blocks other than the at least one field coded candidate macroblock, if any, and (ii) the at least one corresponding averaged horizontal motion vector component. A vertical motion vector component is similarly selected.

When the first and second field horizontal motion vector components of the at least one field coded candidate macroblock are averaged, all fractional pixel offsets are mapped to a half-pixel displacement.

A corresponding decoder method and apparatus are also presented.

A method and apparatus are also presented for padding a digital video image which includes a field coded VOP comprising interleaved top and bottom field pixel lines to provide a padded reference VOP. By padding the VOP, the image area is extended. The VOP is carried, at least in part, in a region which includes pixels which are exterior to boundary pixels of said VOP. The top and bottom field pixel lines are reordered from the interleaved order to provide a top field block comprising the top field pixel lines, and a bottom field block comprising the bottom field pixel lines. The exterior pixels are padded separately within the respective top and bottom field blocks.

After the exterior pixels have been padded, the top and bottom field pixel lines comprising the padded exterior pixels are reordered back to the interleaved order to provide the padded reference image.

During padding, when a particular one of the exterior pixels is located between two of the boundary pixels of the VOP in the corresponding top or bottom field block, the exterior pixel is assigned a value according to an average of the two boundary pixels. When a particular one of the exterior pixels is located between one of the boundary pixels of said VOP and an edge of the region in the corresponding field block, but not between two VOP boundary pixels in the corresponding field block, the exterior pixel is assigned a value according to one of the boundary pixels. The term "between" means bounded by interior pixels along a horizontal or vertical pixel grid line. For example, the region may be a 16×16 macroblock.

When a particular exterior pixel is located between two edges of the region in the corresponding field block, but not between a VOP boundary pixel and an edge of the region, and not between two of the VOP boundary pixels, the particular exterior pixel is assigned a value according to at least one of: (a) a padded exterior pixel which is closest to the particular exterior pixel moving horizontally in the region; and (b) a padded exterior pixel which is closest to the particular exterior pixel moving vertically in the region. For example, when padded exterior pixels are available moving both horizontally and vertically from the particular exterior pixel in the region, the average may be used.

DETAILED DESCRIPTION OF THE INVENTION

A method and apparatus are presented for ME/MC coding of a VOP which is itself interlaced coded, and/or uses reference images which are interlaced coded, and for padding of the area of a reference image for coding of interlaced VOPs.

Figure 1:
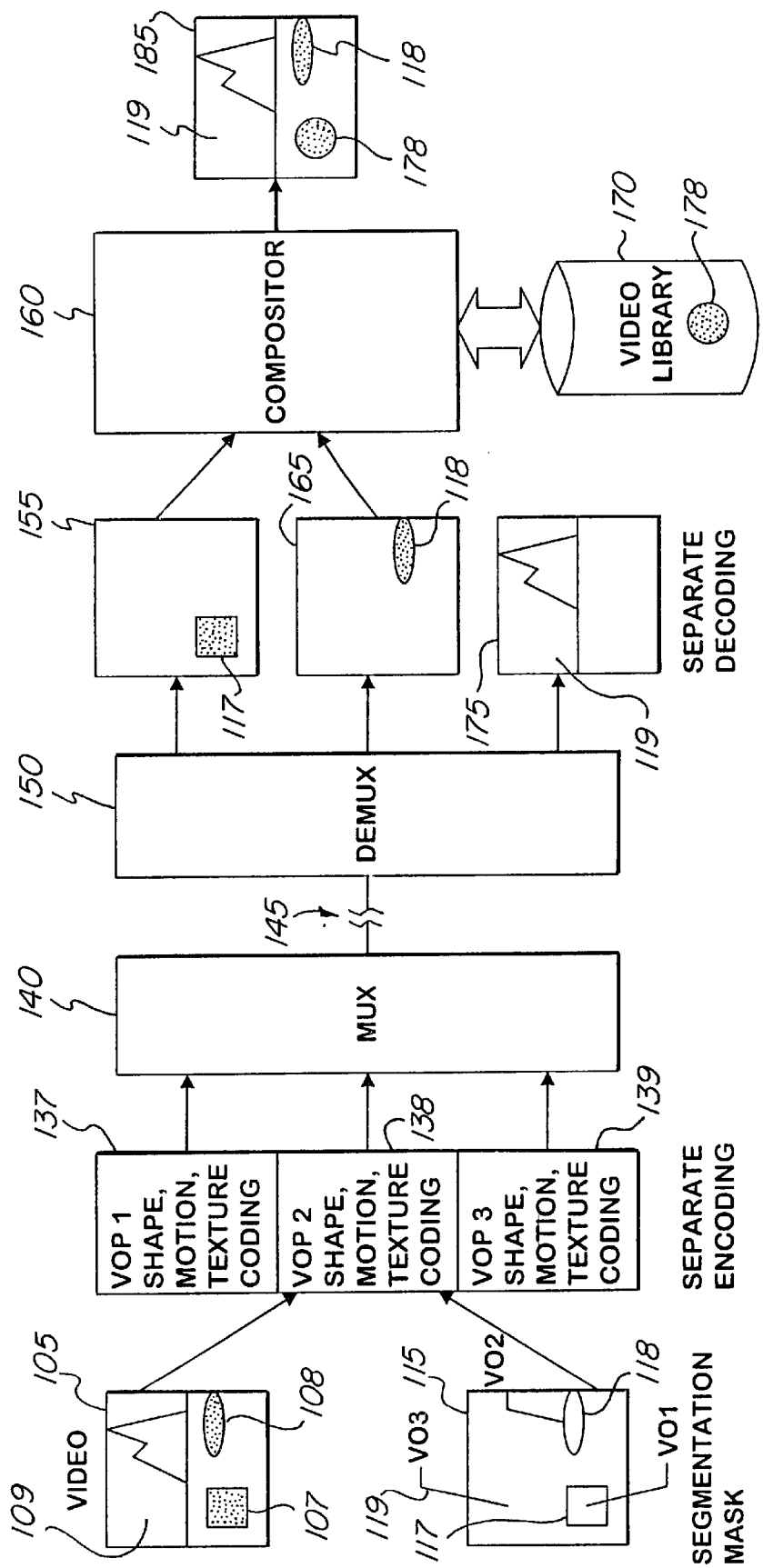
FIG. 1 is an illustration of a video object plane (VOP) coding and decoding process in accordance with the present invention.

FIG. 1 is an illustration of a video object plane (VOP) coding and decoding process in accordance with the present invention. Frame 105 includes three pictorial elements, including a square foreground element 107, an oblong foreground element 108, and a landscape backdrop element 109. In frame 115, the elements are designated VOPs using a segmentation mask such that VOP 117 represents the square foreground element 107, VOP 118 represents the oblong foreground element 108, and VOP 119 represents the landscape backdrop element 109. A VOP can have an arbitrary shape, and a succession of VOPs is known as a video object. A full rectangular video frame may also be considered to be a VOP. Thus, the term "VOP" will be used herein to indicate both arbitrary and non-arbitrary (e.g., rectangular) image area shapes. A segmentation mask is obtained using known techniques, and has a format similar to that of ITU-R 601 luminance data. Each pixel is identified as belonging to a certain region in the video frame.

The frame 105 and VOP data from frame 115 are supplied to separate encoding functions. In particular, VOPs 117, 118 and 119 undergo shape, motion and texture encoding at encoders 137, 138 and 139, respectively. With shape coding, binary and gray scale shape information is encoded. With motion coding, the shape information is coded using motion estimation within a frame. With texture coding, a spatial transformation such as the DCT is performed to obtain transform coefficients which can be variable-length coded for compression.

The coded VOP data is then combined at a multiplexer (MUX) 140 for transmission over a channel 145. Alternatively, the data may be stored on a recording medium. The received coded VOP data is separated by a demultiplexer (DEMUX) 150 so that the separate VOPs 117–119 are decoded and recovered. Frames 155, 165 and 175 show that VOPs 117, 118 and 119, respectively, have been decoded and recovered and can therefore be individually manipulated using a compositor 160 which interfaces with a video library 170, for example.

The compositor may be a device such as a personal computer which is located at a user's home to allow the user to edit the received data to provide a customized image. For example, the user's personal video library 170 may include a previously stored VOP 178 (e.g., a circle) which is different than the received VOPs. The user may compose a frame 185 where the circular VOP 178 replaces the square VOP 117. The frame 185 thus includes the received VOPs 118 and 119 and the locally stored VOP 178.

In another example, the background VOP 109 may be replaced by a background of the user's choosing. For example, when viewing a television news broadcast, the announcer may be coded as a VOP which is separate from the background, such as a news studio. The user may select a background from the library 170 or from another television program, such as a channel with stock price or weather information. The user can therefore act as a video editor.

The video library 170 may also store VOPs which are received via the channel 145, and may access VOPs and other image elements via a network such as the Internet. Generally, a video session comprises a single VOP, or a sequence of VOPs.

The video object coding and decoding process of FIG. 1 enables many entertainment, business and educational applications, including personal computer games, virtual environments, graphical user interfaces, videoconferencing, Internet applications and the like. In particular, the capability for ME/MC with interlaced coded (e.g., field mode) VOPs in accordance with the present invention provides even greater capabilities.

Figure 2:
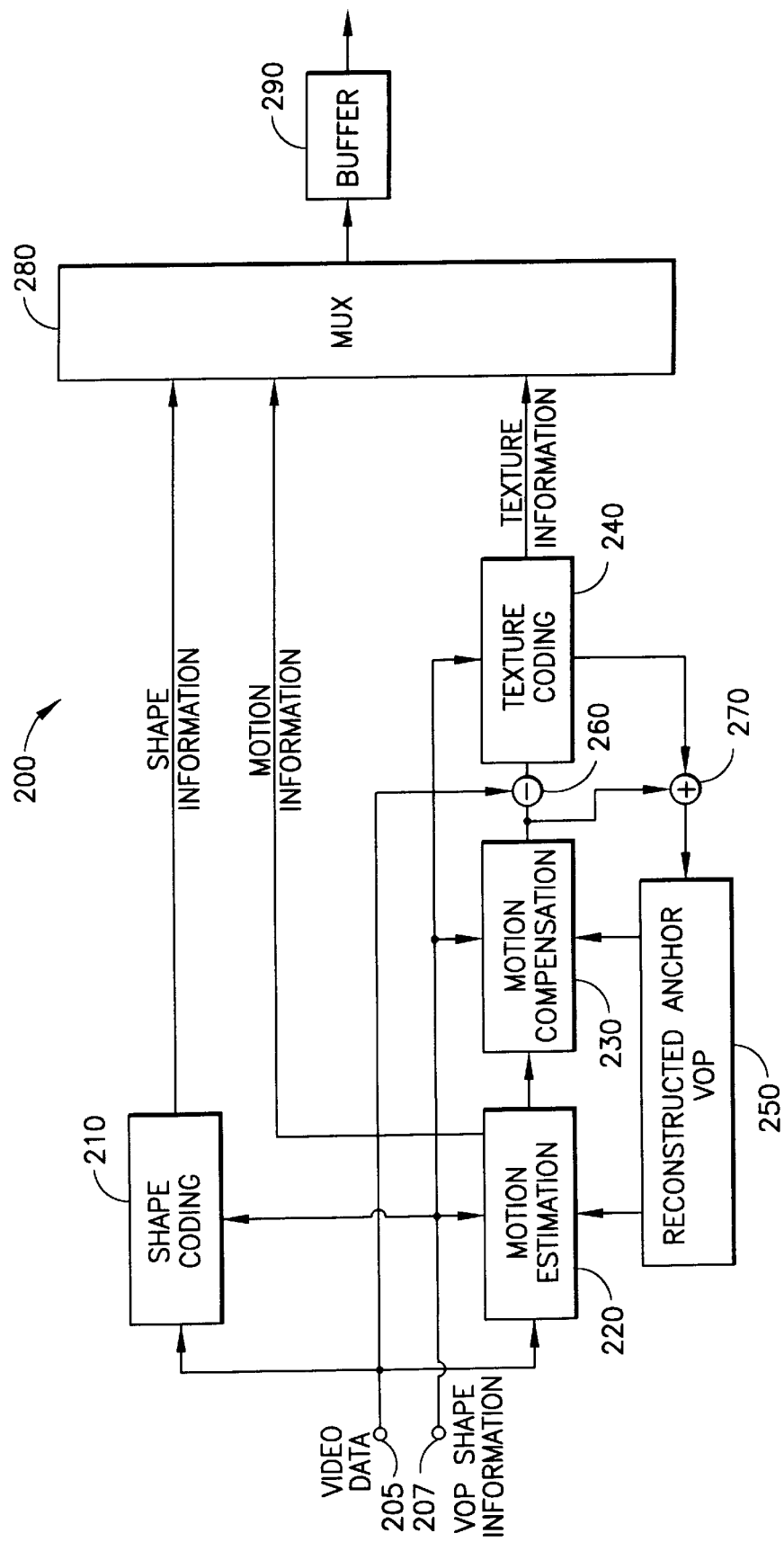
FIG. 2 is a block diagram of an encoder in accordance with the present invention.

FIG. 2 is a block diagram of an encoder in accordance with the present invention. The encoder is suitable for use with both predictive-coded VOPs (P-VOPs) and bi-directionally coded VOPs (B-VOPs).

P-VOPs may include a number of macroblocks which may be coded individually using an intra-frame mode or an inter-frame mode. With intra-frame (INTRA) coding, the macroblock is coded without reference to another macroblock. With inter-frame (INTER) coding, the macroblock is differentially coded with respect to a temporally subsequent frame in a mode known as forward prediction. The temporally subsequent frame is known as an anchor frame or reference frame. The anchor frame (e.g., VOP) must be a P-VOP, not a B-VOP.

With forward prediction, the current macroblock is compared to a search area of macroblocks in the anchor frame to determine the best match. A corresponding motion vector describes the relative displacement of the current macroblock relative to the best match macroblock. Additionally, an advanced prediction mode for P-VOPs may be used, where motion compensation is performed on 8×8 blocks rather than 16×16 macroblocks. Moreover, both intra-frame and inter-frame coded P-VOP macroblocks can be coded in a frame mode or a field mode.

B-VOPs can use the forward prediction mode as described above in connection with P-VOPs as well as backward prediction, bi-directional prediction, and direct mode, which are all inter-frame techniques. B-VOPs do not currently use intra-frame coded macroblocks under the MPEG-4 Video Verification Model Version 7.0 referred to previously, although this is subject to change. The anchor frame (e.g., VOP) must be a P-VOP, not a B-VOP.

With backward prediction of B-VOPS, the current macroblock is compared to a search area of macroblocks in a temporally previous anchor frame to determine the best match. A corresponding motion vector describes the relative displacement of the current macroblock relative to the best match macroblock. With bi-directional prediction of B-VOPs, the current macroblock is compared to a search area of macroblocks in both a temporally previous anchor frame and a temporally subsequent anchor frame to determine the best match. Forward and backward motion vectors describes the relative displacement of the current macroblock relative to the best match macroblocks.

With direct mode prediction of B-VOPs, a motion vector is derived for an 8×8 block when the collocated macroblock in the following P-VOP uses the 8×8 advanced prediction mode. The motion vector of the 8×8 block in the P-VOP is linearly scaled to derive a motion vector for the block in the B-VOP without the need for searching to find a best match block.

The encoder, shown generally at 200, includes a shape coder 210, a motion estimation function 220, a motion compensation function 230, and a texture coder 240, which each receive video pixel data input at terminal 205. The motion estimation function 220, motion compensation function 230, texture coder 240, and shape coder 210 also receive VOP shape information input at terminal 207, such as the MPEG-4 parameter VOP_of_arbitrary_shape. When this parameter is zero, the VOP has a rectangular shape, and the shape coder 210 therefore is not used.

A reconstructed anchor VOP function 250 provides a reconstructed anchor VOP for use by the motion estimation function 220 and motion compensation function 230. For P-VOPs, the anchor VOP occurs after the current VOP in presentation order, and may be separated from the current VOP by one or more intermediate images. The current VOP is subtracted from a motion compensated anchor VOP at subtractor 260 to provide a residue which is encoded at the texture coder 240. The texture coder 240 performs the DCT to provide texture information (e.g., transform coefficients) to a multiplexer (MUX) 280. The texture coder 240 also provides information which is summed with the output from the motion compensator 230 at a summer 270 for input to the reconstructed anchor VOP function 250.

Motion information (e.g., motion vectors) is provided from the motion estimation function 220 to the MUX 280, while shape information which indicates the shape of the VOP is provided from the shape coding function 210 to the MUX 280. The MUX 280 provides a corresponding multiplexed data stream to a buffer 290 for subsequent communication over a data channel.

The pixel data which is input to the encoder may have a YUV 4:2:0 format. The VOP is represented by means of a bounding rectangle. The top left coordinate of the bounding rectangle is rounded to the nearest even number not greater than the top left coordinates of the tightest rectangle. Accordingly, the top left coordinate of the bounding rectangle in the chrominance component is one-half that of the luminance component.

Figure 3:
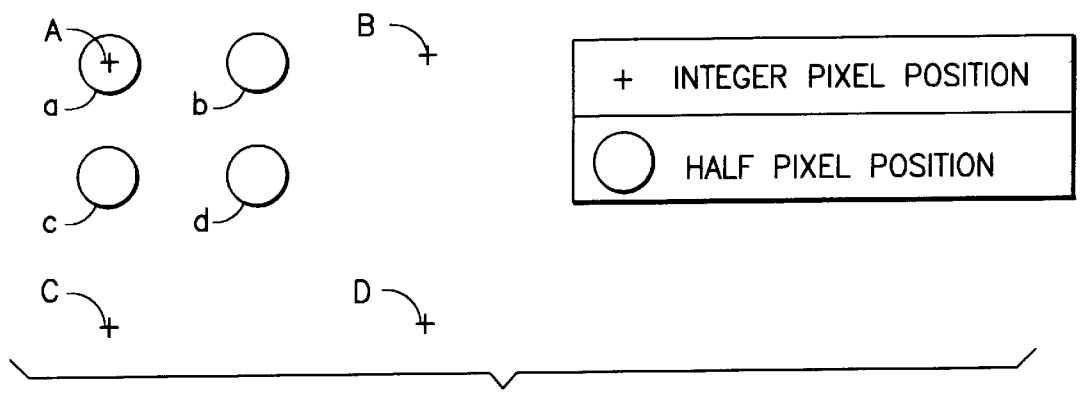
FIG. 3 illustrates an interpolation scheme for a half-pixel search.

FIG. 3 illustrates an interpolation scheme for a half-pixel search. Motion estimation and motion compensation (ME/MC) generally involve matching a block of a current video frame (e.g., a current block) with a block in a search area of a reference frame (e.g., a predicted block or reference block). The reference frame(s) may be separated from the current frame by one or more intermediate images. The displacement of the reference block relative to the current block is the motion vector (MV), which has horizontal (x) and vertical (y) components. Positive values of the MV components indicate that the predicted block is to the right of, and below, the current block.

A motion compensated difference block is formed by subtracting the pixel values of the predicted block from those of the current block point by point. Texture coding is then performed on the difference block. The coded MV and the coded texture information of the difference block are transmitted to the decoder. The decoder can then reconstruct an approximated current block by adding the quantized difference block to the predicted block according to the MV. The block for ME/MC can be a 16×16 frame block (macroblock), an 8×8 frame block or a 16×8 field block.

In ME/MC, it is generally desirable to have small residue values for the difference block, use few bits for the motion vectors, and have a low computational complexity. Due to its lower computational complexity relative to other difference measures, the Sum of Absolute Difference (SAD) is commonly used to select the motion vector which meets these criteria, as follows. Let $\{c(i,j), i,j=0,1,\ldots,N-1\}$ be the pixels of the current block and $\{p(m,n) m,n=-R,-R+1,\ldots,-1,0,1,\ldots,R+N-1\}$ be the pixels in the search range of the reference frame. Then $$SAD_N(x, y) = \begin{cases} \left\{\sum_{i=0}^{N-1}\sum_{j=0}^{N-1} |c(i,j) - p(i,j)|\right\} - C, & \text{if } (x, y) = (0, 0) \\ \sum_{i=0}^{N-1}\sum_{j=0}^{N-1} |c(i,j) - p(i+x, j+y)|, & \text{otherwise} \end{cases}$$

where $\{x,y=-R,-R+1,\ldots,-1,0,1,\ldots,R-1\}$, R and C are positive constants.

The (x, y) pair resulting in the minimum SAD value is the optimum full-pixel motion vector (MV) having horizontal and vertical components, e.g., $(MV_x, MV_y)$. Note that a MV of (0,0) is favored because a positive constant C is subtracted from the SAD when (x, y)=(0,0). For example, for a 16×16 block, C=128. Accordingly, the distribution of MVs can be concentrated near (0, 0) so that entropy coding of the MVs is more efficient.

Accuracy of $(MV_x, MV_y)$ is set at half-pixel. Interpolation must be used on the anchor frame so that p(i+x,j+y) is defined for x or y being half of an integer. Interpolation is performed as shown in FIG. 3. Integer pixel positions are represented by the symbol "+", as shown at A, B, C and D. Half-pixel positions are indicated by circles, as shown at a, b, c and d. As seen, a=A, b=(A+B)//2 c=(A+C)//2, and d=(A+B+C+D)//4, where "//" denotes rounded division, as discussed below in connection with Tables 2 and 3.

A motion compensated difference block is defined as $d(i,j)=c(i,j)-p(i+MV_x,j+MV_y)$, i,j=0,1,...,N-1. The difference block d(i,j) is transformed, quantized, and entropy coded. At a decoder, the motion vector $(MV_x, MV_y)$ and quantized difference block $\{\hat{d}(i,j)\}$ are available to reconstruct the current frame as follows:

$$\hat{c}(i,j)=\hat{d}(i,j)-p(i+MV_x,j+MV_y), i,j=0,1,\ldots,N-1.$$

For a color format of Y:U:V=4:2:0, the macroblock size is 16×16 pixels for the Y (luminance) component, and 8×8 pixels for the U/V (chrominance) components. The search range R (in half-pixel units) can be selected by the user and is signified by a parameter called f_code, where $R=\{(x,y):-2^{f\_code+3} \leq x,y < 2^{f\_code+3}\}$ as shown in Table 1, below. For example, for f_code=1, the motion vector components can assume values from −16 to +15.5, in half-pixel increments. For f_code=2, the motion vector components can assume values from −32 to +31.5 in half-pixel increments.

TABLE 1

| f_code | R |
|---|---|
| 1 | 32 |
| 2 | 64 |
| 3 | 128 |
| 4 | 256 |

Motion vectors for the chrominance blocks are derived from those of the luminance blocks. Since one pixel in a chrominance block corresponds to two pixels in each direction in the corresponding luminance block, i.e., the chrominance component is at half the resolution of the luminance, the MV for the chrominance block is one-half the MV of the luminance block. Moreover, since the MV of the luminance block may have half-pixel values, the MV for the chrominance block may consequently have quarter pixel values. But, since only half-pixel interpolation is used for MC of the chrominance block, the quarter pixel values have to be rounded into half-pixel values. Table 2, below, shows how to perform the required rounding operation. For example, ¼ is rounded to ½, 2/4 is the same as ½ and ¾ is rounded to ½.

TABLE 2

| 1/4 pixel value | 0 | 1 | 2 | 3 |
|---|---|---|---|---|
| 1/2 pixel value | 0 | 1 | 1 | 1 |

Although only the reconstructed previous frame is available at the decoder for MC, there is a choice at the encoder for ME to use either the reconstructed previous frame or the original previous frame. It is advantageous to use the original previous frame in ME, but not MC, since the complexity is lower, and the MV may represent true motion more closely so that the chrominance components may be more accurately predicted.

For some video sequences, such as where there is fast motion or a scene change, coding the difference block may require more bits than direct DCT coding of the actual intensity values of the current block. Accordingly, it is desirable to have a decision criteria for adaptively choosing to code the current block directly (e.g., INTRA mode) or differentially (e.g., INTER mode). The following parameters are calculated to make the INTRA/INTER decision:

$$\text{mean} = \frac{1}{N^2} \sum_{i=0}^{N-1} \sum_{j=0}^{N-1} c(i,j) \text{ and } A = \sum_{i=0}^{N-1} \sum_{j=0}^{N-1} |c(i,j) - \text{mean}|,$$

where N is the size of the block (e.g., N=16). The INTRA mode is chosen if $A<(SAD_{inter}(MV_x,MV_y)-2*Nc)$, otherwise, the INTER mode is used. Note that the MV in $SAD_{inter}(MV_x,MV_y)$ for this decision is at integer pixel resolution. If the INTRA mode is chosen, no further operations are necessary for the motion search. If the INTER mode is chosen, the motion search continues for the half-pixel MV.

Figure 4:
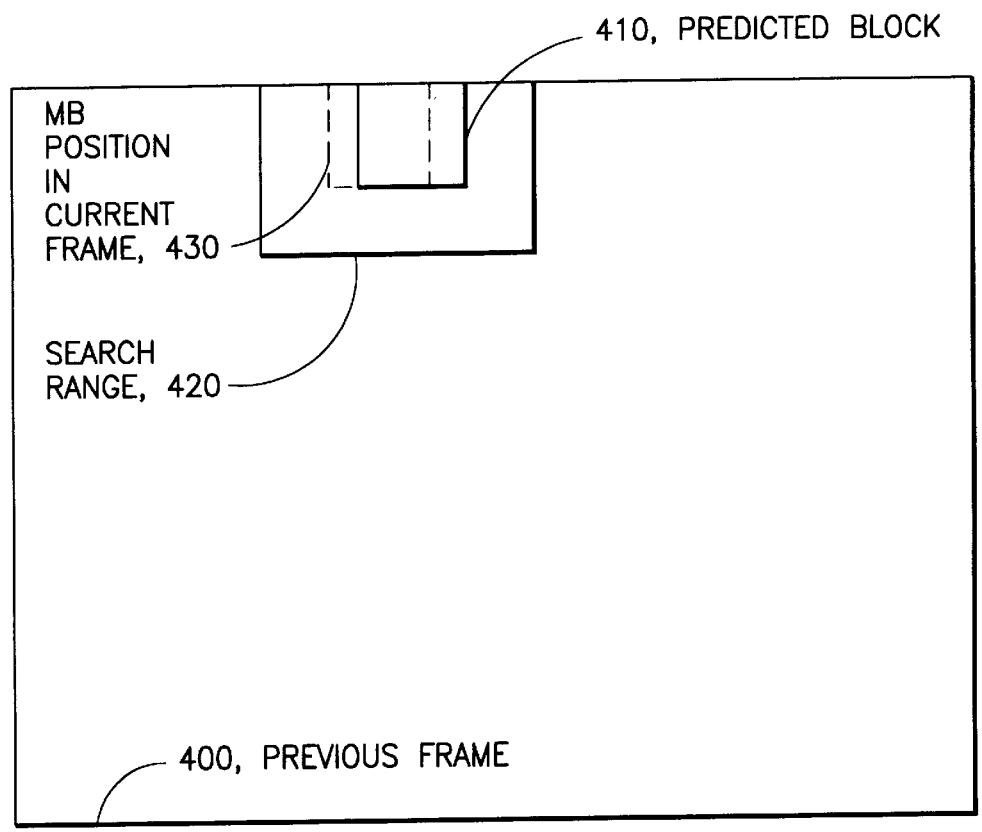
FIG. 4 illustrates a scheme for motion estimation with a restricted motion vector in accordance with the present invention.

FIG. 4 illustrates a scheme for motion estimation with a restricted motion vector in accordance with the present invention. Advanced ME/MC techniques include unrestricted motion vector, advanced prediction, and bidirectional ME/MC. In the basic ME/MC technique, the predicted block is a block in the previous frame. However, if the current block is at a corner or border of the current frame, the range of the MV is restricted. An advanced technique is to allow unrestricted MVs for such corner and border blocks.

With this technique, the previous frame is extended in all four directions (e.g., left, top, right, and bottom) by repeating (e.g., padding) the border pixels a number of times according to a code word (e.g., f_code, described above in Table 1) which indicates the relative range of motion. With a larger range of motion, a correspondingly larger search area is required. The difference block is generated by applying ME/MC against the extended previous frame and taking the difference of the current block and the predicted block that may be partially out of the frame boundary. This technique improves the coding efficiency of the boundary blocks and can result in an improved image.

For example, with the basic ME/MC technique, a previous frame 400 includes a predicted block 410 which is in a search range 420. The relative macroblock (MB) position of the current frame is shown with a dashed line 430. The corresponding motion vector may be, for example, $(MV_x, MV_y)=(8,0)$ if the predicted block is displaced eight pixels horizontally to the right and zero pixels vertically.

Figure 5:
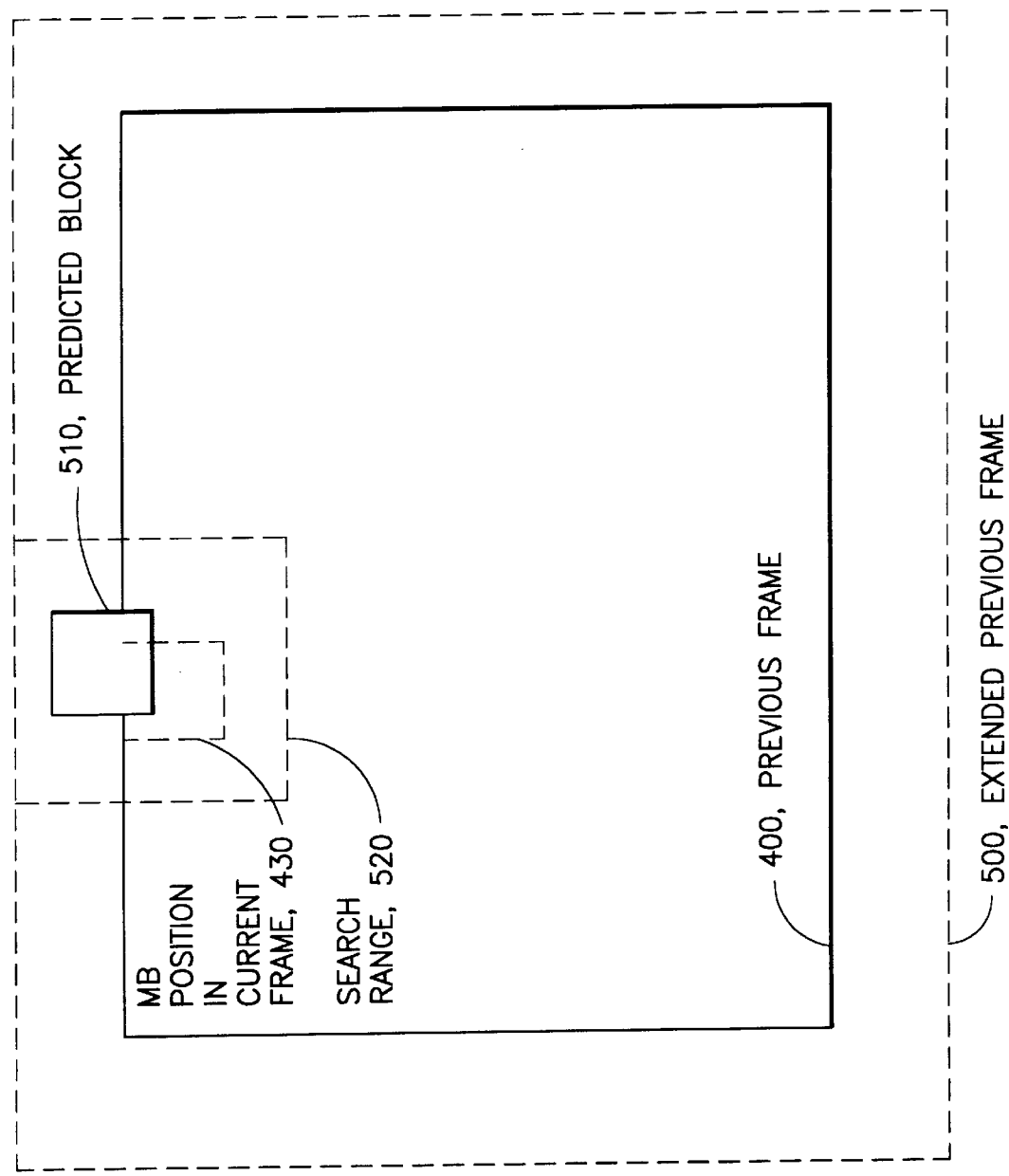
FIG. 5 illustrates a scheme for motion estimation with an unrestricted motion vector in accordance with the present invention.

FIG. 5 illustrates a scheme for motion estimation with an unrestricted motion vector in accordance with the present invention. Like-numbered elements correspond to the elements in FIG. 4. With this advanced ME/MC technique, the search range 520 can cross over the boundary of the previous frame 400 into an extended previous frame 500. The corresponding motion vector may be, for example, $(MV_x, MV_y)=(8, -10)$ if the predicted block is displaced eight pixels horizontally to the right and ten pixels vertically upward, where vertically downward is take as the positive direction.

Figure 6:
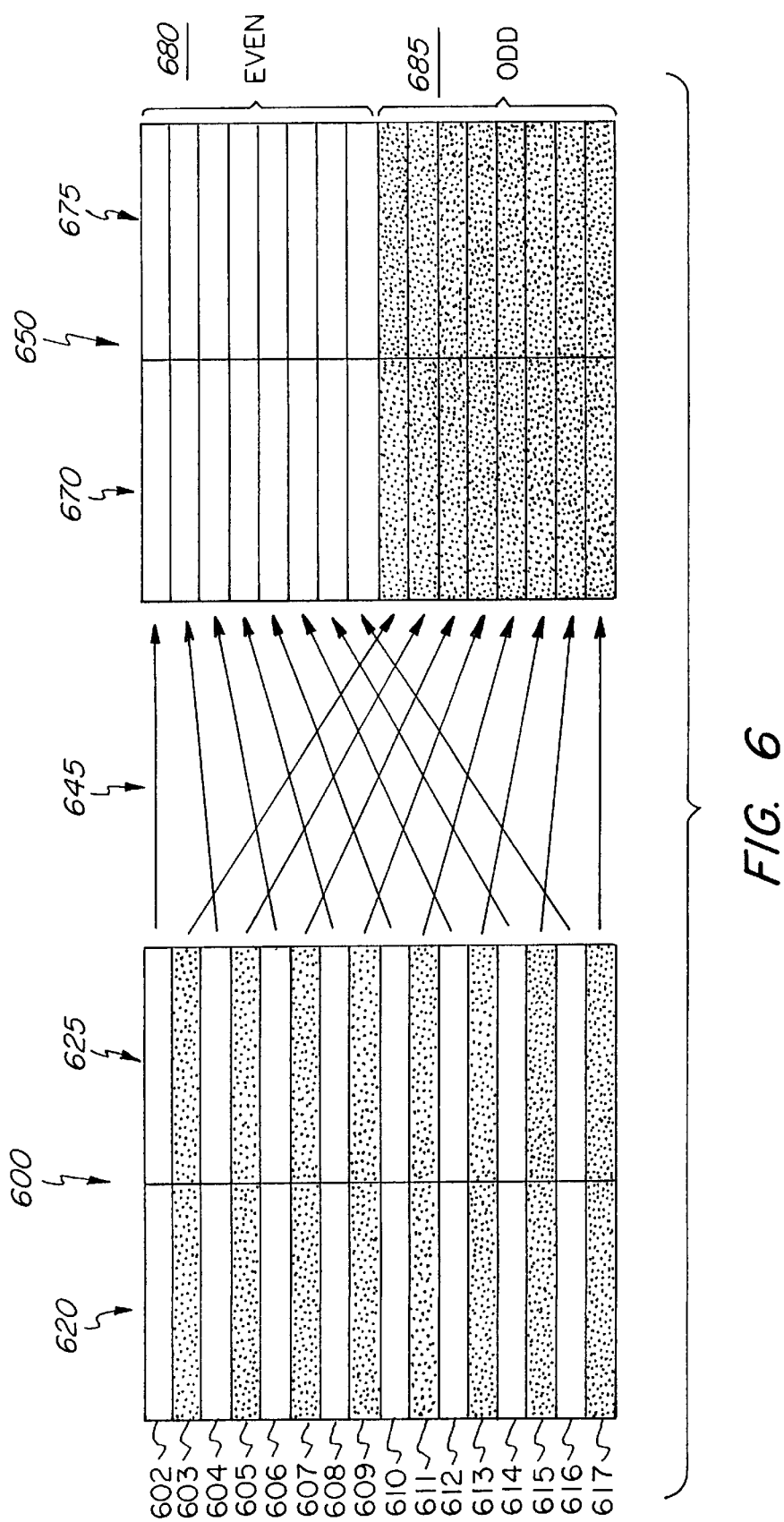
FIG. 6 illustrates reordering of pixel lines in an adaptive frame/field prediction scheme in accordance with the present invention.

FIG. 6 illustrates reordering of pixel lines in an adaptive frame/field prediction scheme in accordance with the present invention. In a first aspect of the advanced prediction technique, an adaptive technique is used to decide whether a current macroblock of 16×16 pixels should be ME/MC coded as is, or divided into four blocks of 8×8 pixels each, where each 8×8 block is ME/MC coded separately, or whether field based motion estimation should be used, where pixel lines of the macroblock are reordered to group the same-field lines in two 16×8 field blocks, and each 16×8 block is separately ME/MC coded.

A field mode image, e.g., a 16×16 macroblock, is shown generally at 600. The macroblock includes even-numbered lines 602, 604, 606, 608, 610, 612, 614 and 616, and odd-numbered lines 603, 605, 607, 609, 611, 613, 615 and 617. The even and odd lines are thus interleaved, and form top and bottom (or first and second) fields, respectively.

When the pixel lines in image 600 are permuted to form same-field luminance blocks, the macroblock shown generally at 650 is formed. Arrows, shown generally at 645, indicate the reordering of the lines 602–617. For example, the even line 602, which is the first line of macroblock 600, is also the first line of macroblock 650. The even line 604 is reordered as the second line in macroblock 650. Similarly, the even lines 606, 608, 610, 612, 614 and 616 are reordered as the third through eighth lines, respectively, of macroblock 650. Thus, a 16×8 luminance region 680 with even-numbered lines is formed. Similarly, the odd-numbered lines 603, 605, 607, 609, 611, 613, 615 and 617 form a 16×8 region 685.

The decision process for choosing the MC mode for P-VOPs is as follows. For frame mode video, first obtain the Sum of Absolute Differences (SAD) for a single 16×16 block, e.g., $SAD_{16}(MV_x,MV_y)$; and for four 8×8 blocks, e.g., $SAD_8(MV_{x1},MV_{y1}),SAD_8(MV_{x2},MV_{y2}),SAD_8(MV_{x3}, MV_{y3})$,and $SAD_8(MV_{x4},MV_{y4})$.

If $$\sum_{i=1}^{4} SAD_8(MV_{xi}, MV_{yi}) < SAD_{16}(MV_x, MV_y) - 128,$$

choose 8×8 prediction; otherwise, choose 16×6 prediction.

For interlaced video, obtain $SAD_{top}(MV_{x\_top}, MV_{y\_top})$, $SAD_{bottom}(MV_{x\_bottom}, MV_{y\_bottom})$, where $(MV_{x\_top}, MV_{y\_top})$ and $(MV_{x\_bottom}, MV_{y\_bottom})$ are the motion vector for both top (even) and bottom (odd) fields. Then, choose the reference field which has the smallest SAD (e.g., for $SAD_{top}$ and $SAD_{bottom}$) from the field half sample search.

The overall prediction mode decision is based on choosing the minimum of:
(a) $SAD_{16}(MV_x, MV_y)$, $$\sum_{i=1}^{4} SAD_8(MV_{xi}, MV_{yi}) + 128, \quad (b)$$

and (c) $SAD_{top}(MV_{x\_top}, MV_{y\_top}) + SAD_{bottom}(MV_{x\_bottom}, MV_{y\_bottom}) + 64$.

If term (a) is the minimum, 16×16 prediction is used. If term (b) is the minimum, 8×8 motion compensation (advanced prediction mode) is used. If term (c) is the minimum, field based motion estimation is used.

If 8×8 prediction is chosen, there are four MVs for the four 8×8 luminance blocks, i.e., one MV for each 8×8 block. The MV for the two chrominance blocks is then obtained by taking an average of these four MVs and dividing the average value by two. Since each MV for the 8×8 luminance block has a half-pixel accuracy, the MV for the chrominance blocks may have a sixteenth pixel value. Table 3, below, specifies the conversion of a sixteenth pixel value to a half-pixel value for chrominance MVs. For example, 0 through ²⁄₁₆ are rounded to 0, ³⁄₁₆ through ¹³⁄₁₆ are rounded to ½, and ¹⁴⁄₁₆ and ¹⁵⁄₁₆ are rounded to ²⁄₂=1.

The second aspect of the advanced prediction technique is overlapped MC for luminance blocks. In the following discussion, four MVs are always assumed for a 16×16 luminance block. The case of one 16×16 MV can be considered as having four identical 8×8 MVs. Each pixel in an 8×8 luminance predicted block is a weighted sum of three prediction values specified in the following equation:

$$p'(i,j) = (H_0(i,j) \cdot q(i,j) + H_1(i,j) \cdot r(i,j) + H_2(i,j) \cdot s(i,j))/8$$

where division by eight is with rounding off to the nearest half-pixel, with rounding away from zero. The weighting matrices for $H_0(i,j)$, $H_1(i,j)$ and $H_2(i,j)$ are specified in Tables 4–6, respectively, below. $(i,j)=(0,0)$ is the upper left hand value in each table, and $(i,j)=(7,7)$ is the lower right hand corner value.

In Table 5, the top four rows indicate the top neighbor motion vector weights, while the bottom four rows indicate the bottom neighbor motion vector weights. Table 6, the four left-hand columns indicate the left-hand neighbor motion vector weights, while the four right-hand columns indicate the right-hand neighbor motion vector weights.

TABLE 4

| | | | | | | | |
|---|---|---|---|---|---|---|---|
| 4 | 5 | 5 | 5 | 5 | 5 | 5 | 4 |
| 5 | 5 | 5 | 5 | 5 | 5 | 5 | 5 |
| 5 | 5 | 6 | 6 | 6 | 6 | 5 | 5 |
| 5 | 5 | 6 | 6 | 6 | 6 | 5 | 5 |
| 5 | 5 | 6 | 6 | 6 | 6 | 5 | 5 |
| 5 | 5 | 6 | 6 | 6 | 6 | 5 | 5 |
| 5 | 5 | 5 | 5 | 5 | 5 | 5 | 5 |
| 4 | 5 | 5 | 5 | 5 | 5 | 5 | 4 |

TABLE 5

| | | | | | | | |
|---|---|---|---|---|---|---|---|
| 2 | 2 | 2 | 2 | 2 | 2 | 2 | 2 |
| 1 | 1 | 2 | 2 | 2 | 2 | 1 | 1 |
| 1 | 1 | 1 | 1 | 1 | 1 | 1 | 1 |

TABLE 3

| ¹⁄₁₆ pixel value | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| ½ pixel value | 0 | 0 | 0 | 1 | 1 | 1 | 1 | 1 | 1 | 1 | 1 | 1 | 1 | 1 | 2 | 2 |

With field prediction, there are two MVs for the two 16×8 blocks. The luminance prediction is generated as follows. The even lines of the macroblock (e.g., lines 602, 604, 606, 608, 610, 612, 614 and 616) are defined by the top field motion vector using the reference field specified. The motion vector is specified in frame coordinates such that full pixel vertical displacements correspond to even integral values of the vertical motion vector coordinate, and a half-pixel vertical displacement is denoted by odd integral values. When a half-pixel vertical offset is specified, only pixels from lines within the same reference field are combined.

The MV for the two chrominance blocks is derived from the (luminance) motion vector by dividing each component by 2, then rounding as follows. The horizontal component is rounded by mapping all fractional values into a half-pixel offset. This is the same procedure as described in Table 2. The vertical motion vector component is an integer and the resulting chrominance motion vector vertical component is rounded to an integer. If the result of dividing by two yields a non-integral value, it is rounded to the adjacent odd integer. Note that the odd integral values denote vertical interpolation between lines of the same field.

TABLE 5-continued

| | | | | | | | |
|---|---|---|---|---|---|---|---|
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 2 | 2 | 2 | 2 | 1 | 1 |
| 2 | 2 | 2 | 2 | 2 | 2 | 2 | 2 |

TABLE 6

| | | | | | | | |
|---|---|---|---|---|---|---|---|
| 2 | 1 | 1 | 1 | 1 | 1 | 1 | 2 |
| 2 | 2 | 1 | 1 | 1 | 1 | 2 | 2 |
| 2 | 2 | 1 | 1 | 1 | 1 | 2 | 2 |
| 2 | 2 | 1 | 1 | 1 | 1 | 2 | 2 |
| 2 | 2 | 1 | 1 | 1 | 1 | 2 | 2 |
| 2 | 2 | 1 | 1 | 1 | 1 | 2 | 2 |
| 2 | 2 | 1 | 1 | 1 | 1 | 2 | 2 |
| 2 | 1 | 1 | 1 | 1 | 1 | 1 | 2 |

The values of $q(i,j)$, $r(i,j)$, and $s(i,j)$ are the pixels of the previous frame, defined as follows.

$$q(i,j)=p(i+MV_x^0, j+MV_y^0).$$

$$r(i,j)=p(i+MV_x^1, j+MV_y^1).$$

$$s(i,j)=p(i+MV_x^2, j+MV_y^2).$$

where $(MV_x^0, MV_y^0)$ is the MV of the current 8×8 luminance block, $(MV_x^1, MV_y^1)$ is the MV of the block either above (for j=0, 1,2,3) or below (for j=4,5,6,7) the current block, and $(MV_x^2, MV_y^2)$ is the MV of the block either to the left (for i=0,1,2,3) or right (for i=4,5,6,7) of the current block.

Figure 7:
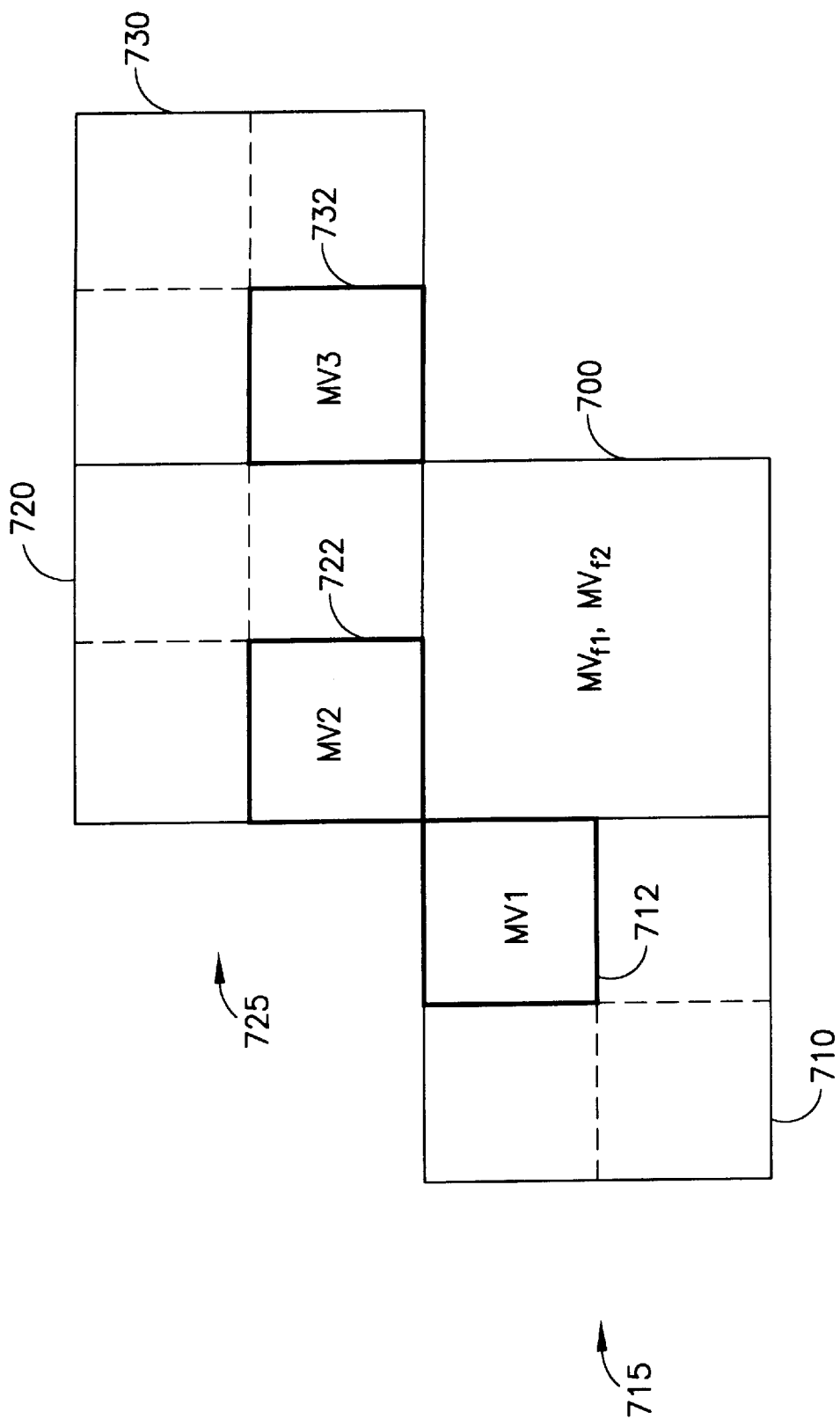
FIG. 7 illustrates a current field mode macroblock with neighboring frame mode blocks having associated candidate motion vector predictors in accordance with the present invention.

FIG. 7 illustrates a current field mode macroblock with neighboring frame mode blocks having associated candidate motion vector predictors in accordance with the present invention. A P-VOP may be used. When using INTER mode coding, the motion vectors for the current image blocks must be transmitted. The motion vectors are coded differentially by using a spatial neighborhood of motion vectors which are already transmitted. That is, since data is processed from top to bottom and from left to right across an image in virtually all video standards, motion vectors from blocks which are above and/or to the left of a current block are available for processing the current block. These motion vectors are therefore candidate predictors for differential coding.

Motion vector coding is performed separately on the horizontal and vertical components of the current block. For each MV component in a P-VOP, for example, the median value of the candidate predictors for the same component may be computed, and the difference value between component and median values may be coded using variable length codes.

When interlaced coding tools are used, candidate predictors for field-based motion vectors in a current P-VOP can be obtained as follows. Let macroblock 700 be a current field mode macroblock (e.g., 16×6 pixels). Surrounding macroblocks include a macroblock 710 which immediately precedes the current macroblock 700 in the current row 715, a macroblock 720 which is immediately above the current macroblock in a preceding row 725, and a macroblock 730 which immediately follows the macroblock 720 in the preceding row.

The macroblock 700 has associated first field horizontal and vertical motion vectors $MV_{xf1}$ and $MV_{yf1}$, respectively, and second field horizontal and vertical motion vectors $MV_{xf2}$ and $MV_{yf2}$, respectively. Vertical and horizontal motion vector components are not shown separately in FIG. 7 for simplicity. For example, assume the first field includes even-numbered rows, and the second field includes odd-numbered rows. Moreover, in the example shown, advanced prediction mode is used for macroblocks 710, 720 and 730, so that macroblock 710 includes an 8×8 candidate block 712 with associated horizontal and vertical motion vectors $MV1_x$ and $MV1_y$, respectively, macroblock 720 includes an 8×8 candidate block 722 with associated horizontal and vertical motion vector components $MV2_x$ and $MV2_y$, respectively, and macroblock 730 includes an 8×8 candidate block 732 with associated horizontal and vertical motion vector components $MV3_x$ and $MV3_y$, respectively. However, it also possible for any or all of the candidate blocks 712, 722 and 732 to be macroblocks, i.e., where advanced prediction mode is not used. None of the macroblocks 710, 720, 730 is field predicted in the present illustration.

When a particular 8×8 sub-block of a macroblock is used as a candidate, the macroblock will have three other sub-blocks with associated horizontal and vertical motion vector components which are suitable for use in differentially encoding the motion vector components of the current field coded macroblock 700. Generally, is desirable to select the sub-block in the particular macroblock which is closest to the upper left-hand portion of the current macroblock as the candidate block as shown.

Predictor horizontal and vertical motion vector components, $P_x$ and $P_y$, respectively, can be determined in accordance with the present invention from $P_x$=median$(MV1_x, MV2_x, MV3_x)$ and $P_y$=median$(MV1_y, MV2_y, MV3_y)$. It has been found that the use of the median provides efficient coding. The median is the middle number in an ordered sequence having an odd number of elements, or the average of the two middle numbers of a sequence having an even number of elements. For example, the median of the sequence (1, 2, 4) is 2, and the median of the sequence (1, 2, 4, 10) is 3. The median is the same as the average when there are two numbers in a sequence.

Other functions besides the median may be used. For example, the average may be used, i.e., $P_x = \frac{1}{3}MV1_x + \frac{1}{3}MV2_x + \frac{1}{3}MV3_x$. Alternatively, some other weighting scheme may be used, e.g., $P_x = 0.4MV1_x + 0.4MV2_x + 0.2MV3_x$. Moreover, while three candidate blocks are used in the present example, two or more may be used. Furthermore, the location of the candidate blocks may vary. For example, a candidate block (not shown) which immediately precedes macroblock 720 may be used. Moreover, for coding schemes which employ sufficient buffering capability, candidate blocks which follow the current macroblock 700 in the current row 715, or a subsequent row (not shown) may be used.

For differential coding of the current macroblock to obtain a motion vector difference value, MVD, in accordance with the present invention, both fields use the same predictor. That is, $MVD_{xf1}=MV_{xf1}-P_x$, $MVD_{yf1}=MV_{yf1}-P_y$, $MVD_{xf2}=MV_{xf2}-P_x$, and $MVD_{yf2}=MV_{yf2}-P_y$.

Figure 8:
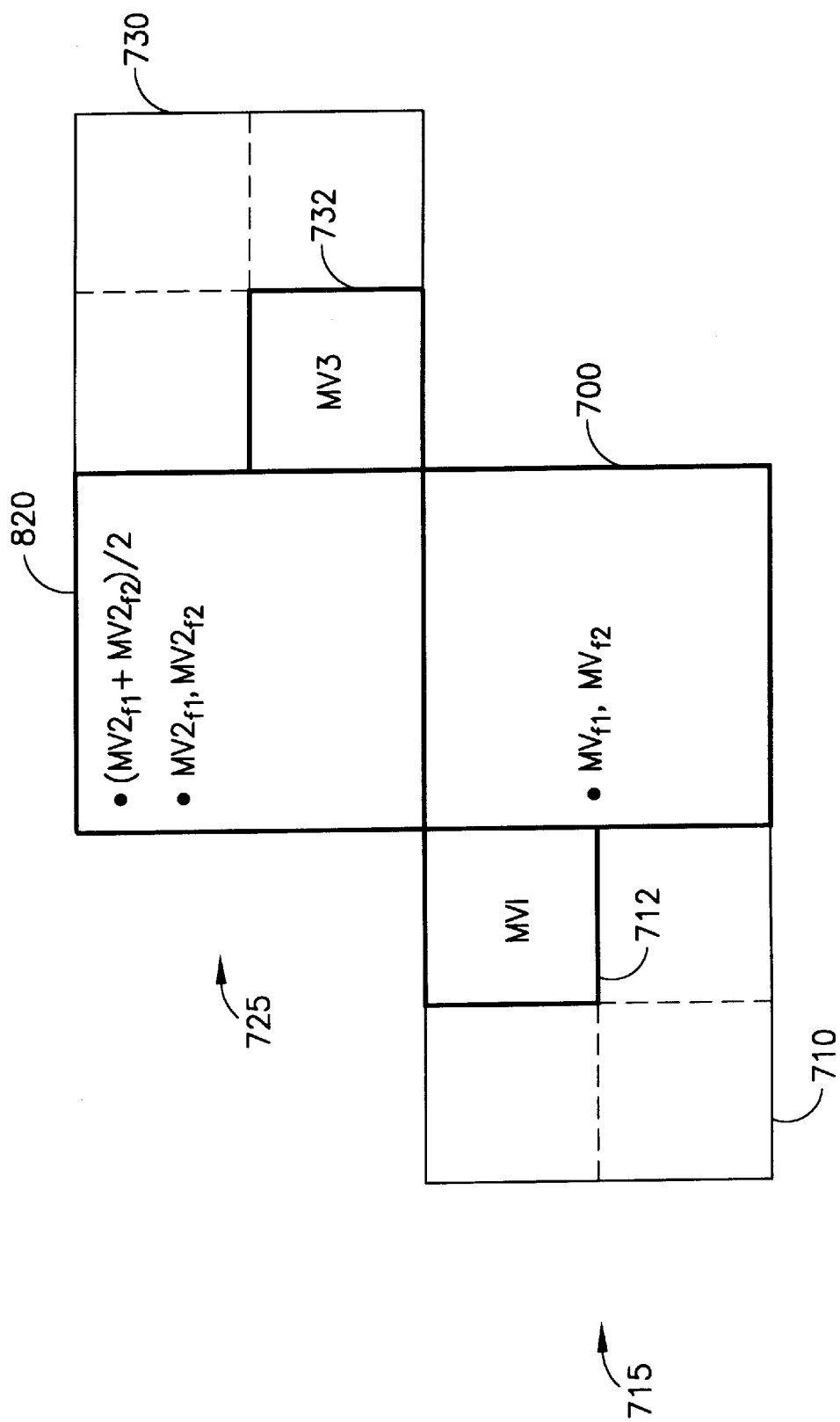
FIG. 8 illustrates a current field mode macroblock with neighboring frame mode blocks and field mode macroblock having associated candidate motion vector predictors in accordance with the present invention.

FIG. 8 illustrates a current field mode macroblock with neighboring frame mode blocks and field mode macroblock having associated candidate motion vector predictors in accordance with the present invention. A P-VOP may be used. Like-numbered elements correspond to the elements in FIG. 7. Vertical and horizontal motion vector components are not shown separately in FIG. 8 for simplicity. Here, candidate macroblock 820 which is immediately above the current macroblock 700 in the previous row 725 is field coded. Thus, macroblock 820 has associated first and second field vectors, including horizontal motion vector components $MV2_{xf1}$ and $MV2_{xf2}$, and vertical motion vector components, $MV2_{yf1}$ and $MV2_{yf2}$.

Generally, when the current macroblock is field predicted, and at least one of the spatial neighborhood macroblocks is field predicted, then the candidate motion vector predictors can be generated by using the same field of the candidate blocks. That is, for the first field of the current macroblock, the first field motion vector(s) of the surrounding field predicted macroblock(s) are used. Similarly, for the second field of the current macroblock, the second field motion vector(s) of the surrounding field predicted macroblock(s) are used.

Specifically, the first field horizontal predictor is $P_{xf1}$=median$(MV1_x, MV2_{xf1}, MV3_x)$, the first field vertical predictor is $P_{yf1}$=median$(MV1_y, MV2_{yf1}, MV3_y)$, the second field horizontal predictor is $P_{xf2}$=median$(MV1_x, MV2_{xf2}, MV3_x)$, and the second field vertical predictor is $P_{yf2}$=median$(MV1_y, MV2_{yf2}, MV3_y)$ The motion vector difference values are $MVD_{xf1}=MV_{xf1}-P_{xf1}$, $MVD_{yf1}=MV_{yf1}-P_{yf1}$, $MVD_{xf2}=MV_{xf2}-P_{xf2}$, and $MVD_{xf2}=MV_{yf2}-P_{yf2}$.

Alternatively, the first and second field motion vectors of macroblock 820 (and any other field mode candidate macroblock) may be averaged to obtain averaged horizontal and vertical motion vector components. The processing then proceeds as discussed in connection with FIG. 7. Specifically, an averaged horizontal motion vector component for macroblock 820 is $MV2_x=(MV2_{xf1}+MV2_{xf2})/2$, while an averaged vertical motion vector component for macroblock 820 is $MV2_y=(MV2_{yf1}+MV2_{yf2})/2$. Predictor horizontal and vertical motion vector components, respectively, are $P_x=\text{median}(MV1_x, MV2_x, MV3_x)$ and $P_y=\text{median}(MV1_y, MV2_y, MV3_y)$ The motion vector difference values for the current macroblock 700 are $MVD_{xf1}=MV_{xf1}-P_x$, $MVD_{yf1}=MV_{yf1}-P_y$, $MVD_{xf2}=MV_{xf2}-P_x$, and $MVD_{yf2}=MV_{yf2}-P_y$.

When two or more of the candidate macroblocks are field predicted, processing may proceed as above for each field predicted macroblock.

For coding efficiency, to ensure that the vertical component of a field motion vector is an integer, the vertical difference motion vector component is encoded in the bitstream as $MVD_{yf1}=(MV_{yf1}-\text{int}(P_y))/2$, where $\text{int}(P_y)$ means truncate $P_y$ in the direction of zero to the nearest integer. This assures that all fractional pixel offsets are mapped to a half-pixel displacement. For example, if $MV_{yf1}=4$ and $P_y=3.5$, then $MVD_{yf1}=(MV_{yf1}-\text{int}(P_y))/2=(4-\text{int}(3.5))/2=(4-3)/2=0.5$. Otherwise, without the "int" function, $MVD_{yf1}=(MV_{yf1}-P_y)/2=(4-3.5)/2=(0.5)/2=0.25$, which cannot be coded as efficiently. The factor of ½ is used to reduce the magnitude of $MVD_{yf1}$ thus making it more efficiently coded by the motion vector VLC.

Figure 9:
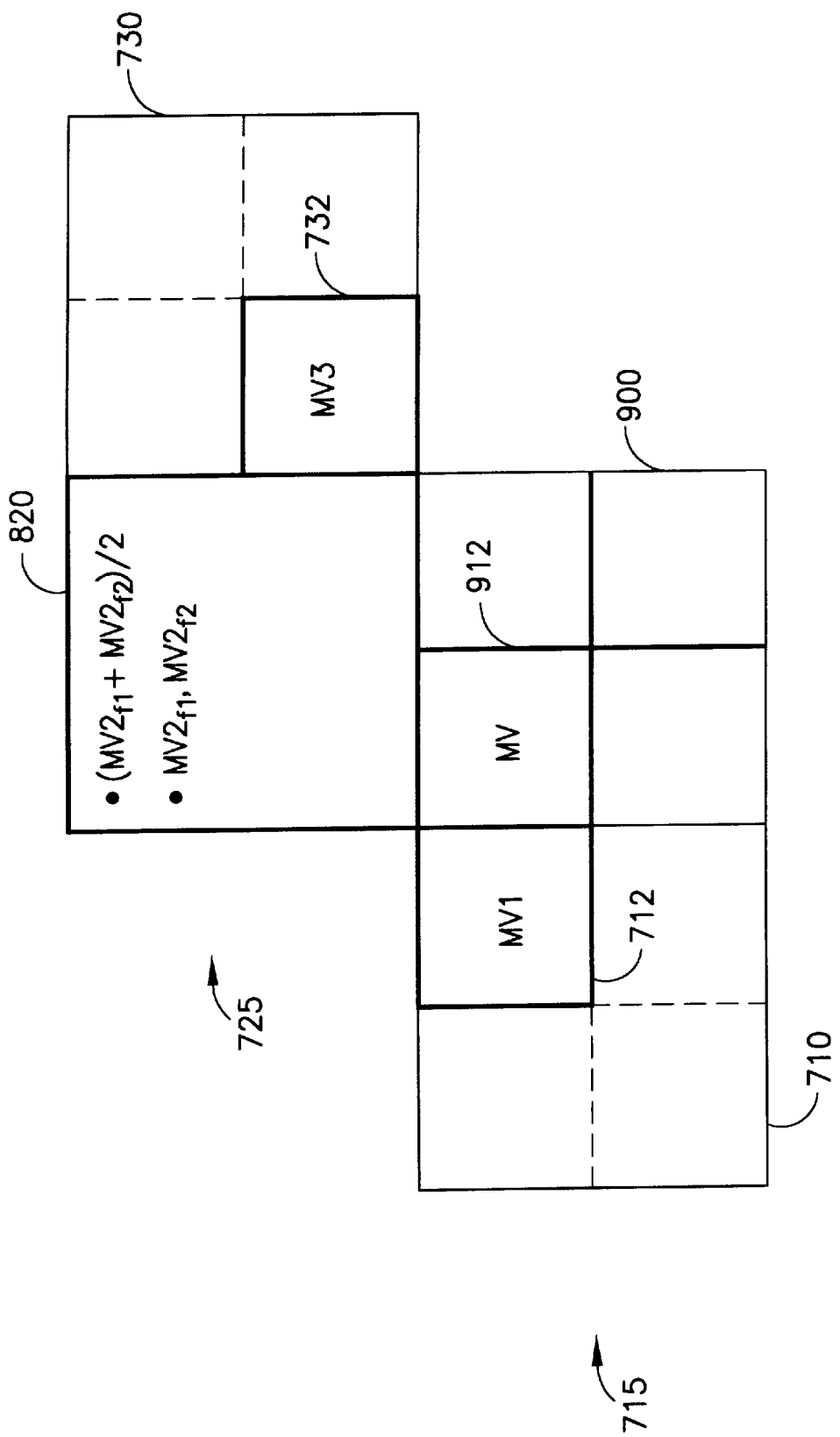
FIG. 9 illustrates a current advanced prediction mode block with neighboring frame mode blocks and field mode macroblock having associated candidate motion vector predictors in accordance with the present invention.

FIG. 9 illustrates a current advanced-prediction mode block with neighboring frame mode blocks and a field mode macroblock having associated candidate motion vector predictors in accordance with the present invention. A P-VOP may be used. Like-numbered elements correspond to the elements in FIGS. 7 and 8. Vertical and horizontal motion vector components are not shown separately in FIG. 9 for simplicity. The current block 912 in a current macroblock 900 is shown as an advanced prediction 8×8 block. Alternatively, the current block 912 may be a frame mode (progressive) macroblock which is the same as macroblock 900. Recall that with advanced prediction mode, each of the four 8×8 blocks in a macroblock is ME/MC coded separately.

Generally, when the current block is coded as a progressive macroblock or an advanced prediction (8×8) block, and at least one of the coded spatial neighborhood macroblocks is field predicted, the candidate motion vector components can be generated by averaging the first and second field motion vector components, by using both of the first and second field motion vector components as candidates, or by using one of the first and second field motion vector components, but not both. Specifically, in a first option, the motion vector components of the interlaced candidate macroblock(s) are averaged within the block. For example, for macroblock 820, averaged motion vector components are $MV2_x=(MV2_{xf1}+MV2_{xf2})/2$, and $MV2_y=(MV2_{yf1}+MV2_{yf2})/2$. Predictor horizontal and vertical motion vector components, respectively, are $P_x=\text{median}(MV1_x, MV2_x, MV3_x)$ and $P_y=\text{median}(MV1_y, MV2_y, MV3_y)$, and the motion vector difference values for the current block 912 are $MVD_x=MV_x-P_x$ and $MVD_y=MV_y-P_y$. $MV_x$ and $MV_y$ are the horizontal and vertical motion vector components, respectively, of the current block 912.

In a second option, both of the field motion vectors of the macroblock 820 are candidate predictors. For example, for macroblock 820, the predictor horizontal and vertical motion vector components, $P_x$ and $P_y$, respectively, can be determined from $P_x=\text{median}(MV1_x, MV2_{xf1}, MV2_{xf2}, MV3_x)$ and $P_y=\text{median}(MV1_y, MV2_{yf1}, MV2_{yf2}, MV_y)$, and the motion vector difference values for the current block 912 are $MVD_x=MV_x-P_x$ and $MVD_y=MV_y-P_y$.

In a third option, the first field motion vectors of the macroblock 820 are candidate predictors. For example, for macroblock 820, the predictor horizontal and vertical motion vector components, respectively, are $P_x=\text{median}(MV1_x, MV2_{xf1}, MV3_x)$ and $P_y=\text{median}(MV1_y, MV2_{yf1}, MV_y)$. The motion vector difference values for the current block 912 are $MVD_x=MV_x-P_x$ and $MVD_y=MV_y-P_y$.

In a fourth option, the second field motion vectors of the macroblock 820 are candidate predictors. For example, for macroblock 820, the predictor horizontal and vertical motion vector components, respectively, are $P_x=\text{median}(MV1_x, MV2_{xf2}, MV3_y)$ and $P_y=\text{median}(MV1_y, MV2_{yf2}, MV_y)$. The motion vector difference values for the current block 912 are $MVD_x=MV_x-P_x$ and $MVD_y=MV_y-P_y$.

As discussed previously, when averaging pixel data from first and second fields, all fractional pixel offsets are mapped to a half-pixel displacement for coding efficiency.

Figure 10:
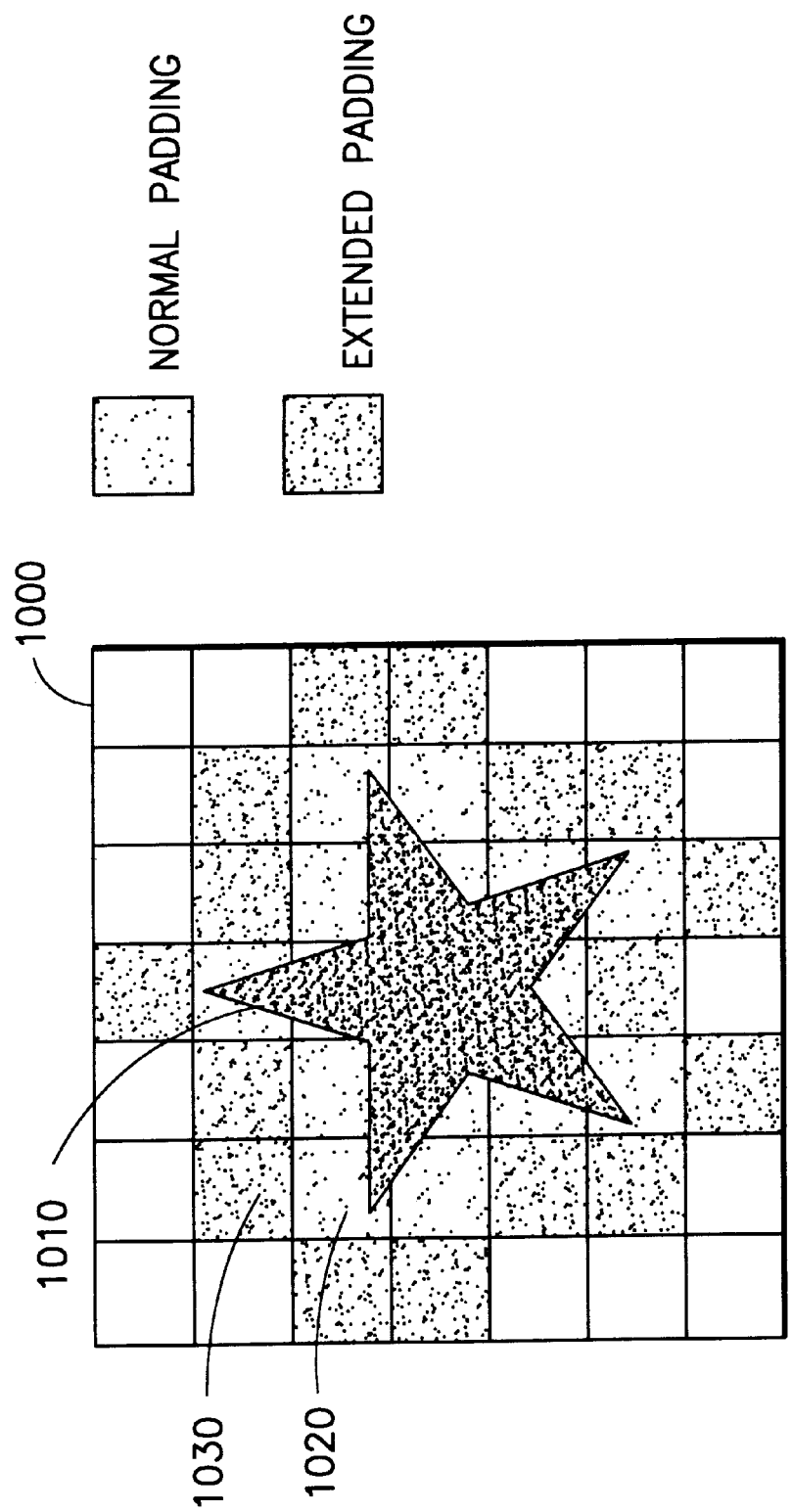
FIG. 10 illustrates macroblock-based VOP padding for motion prediction in accordance with the present invention.

FIG. 10 illustrates macroblock-based VOP padding for motion prediction in accordance with the present invention. At an encoder, padding is used to increase the area of a reference image for motion estimation prior to motion compensation. The technique is particularly suited for use with arbitrarily shaped video object planes (VOPs). A macroblock can similarly be padded at a decoder as soon as the macroblock is reconstructed. For example, a star-shaped VOP 1010 in a frame or other image region 1000 may be padded to fill blocks which are at the boundary of the VOP as well as other neighboring macroblocks.

The blocks designated by light shading (e.g., such as block 1020) are all boundary blocks, and are processed with normal padding. Blocks designated with darker shading (e.g., such as block 1030) are adjacent to the boundary blocks and are processed with extended padding. Further extended block (not shown) may also be padded. The amount of padding required is related to the parameter f_code discussed above in connection with Table 1. The blocks may be 16×16 luminance blocks or 8×8 chrominance blocks.

Padding fills the areas outside the VOP by repeating the boundary pixels of the VOP. If a pixel outside the VOP can be padded by the repetition of more than one boundary pixel, the average of those particular boundary pixels is used. Normal padding refers to padding within a boundary block. First, each horizontal line of the blocks in frame 1000 is scanned to provide continuous line segments which are either interior to the VOP (e.g., including boundary pixels of the VOP), or exterior to the VOP. If the entire line in a block is interior to the VOP, no padding is performed.

If there are both interior and exterior segments in a block, and the exterior segment is positioned between an interior segment and the edge of the block, the pixels in the exterior segment are set to the interior segment pixel value at the boundary of the VOP which is closest to that particular exterior segment. For example, for the left to right sequence E1–E5 and I6–I16 in a 16 pixel scan line, where "E" denotes and exterior pixel and "I" denotes an interior pixel, E1–E5 are set to I6. For the sequence E1–E5, I6–I110 and E11–E16, E1–E5 are set to I6, and E11–E16 are set to I10.

If an exterior segment is between two interior segments, the exterior segment is filled with the average of the two boundary pixels of the interior segments. For example, for the sequence I1–I5, E6–E10 and I11–I16, E6–E10 are set to (I5+I11)/2.

The above process is repeated for each horizontal and vertical scan line in each block. If a pixel can be padded by both horizontal and vertical boundary pixels, the average is used.

It is possible for an exterior line segment to extend horizontally across a block without encountering an interior line segment. In this case, for each pixel in the line segment, scan horizontally in both directions to find the closest padded exterior pixel. If there is a tie (i.e., padded pixels to the right and left are equidistant from a current pixel), use the pixel to the left of the current pixel.

Similarly, it is possible for an exterior line segment to extend vertically across a block without encountering an interior line segment. In this case, for each pixel in the line segment, scan vertically in both directions to find the closest padded exterior pixel. If there is a tie (i.e., padded pixels above and below are equidistant from a current pixel), use the pixel above the current pixel. The exterior pixel is then replaced by the average of the pixels found in the horizontal and vertical bi-directional scans.

However, when the VOP is interlaced coded, a modified padding technique as described below may be used.

Figure 11:
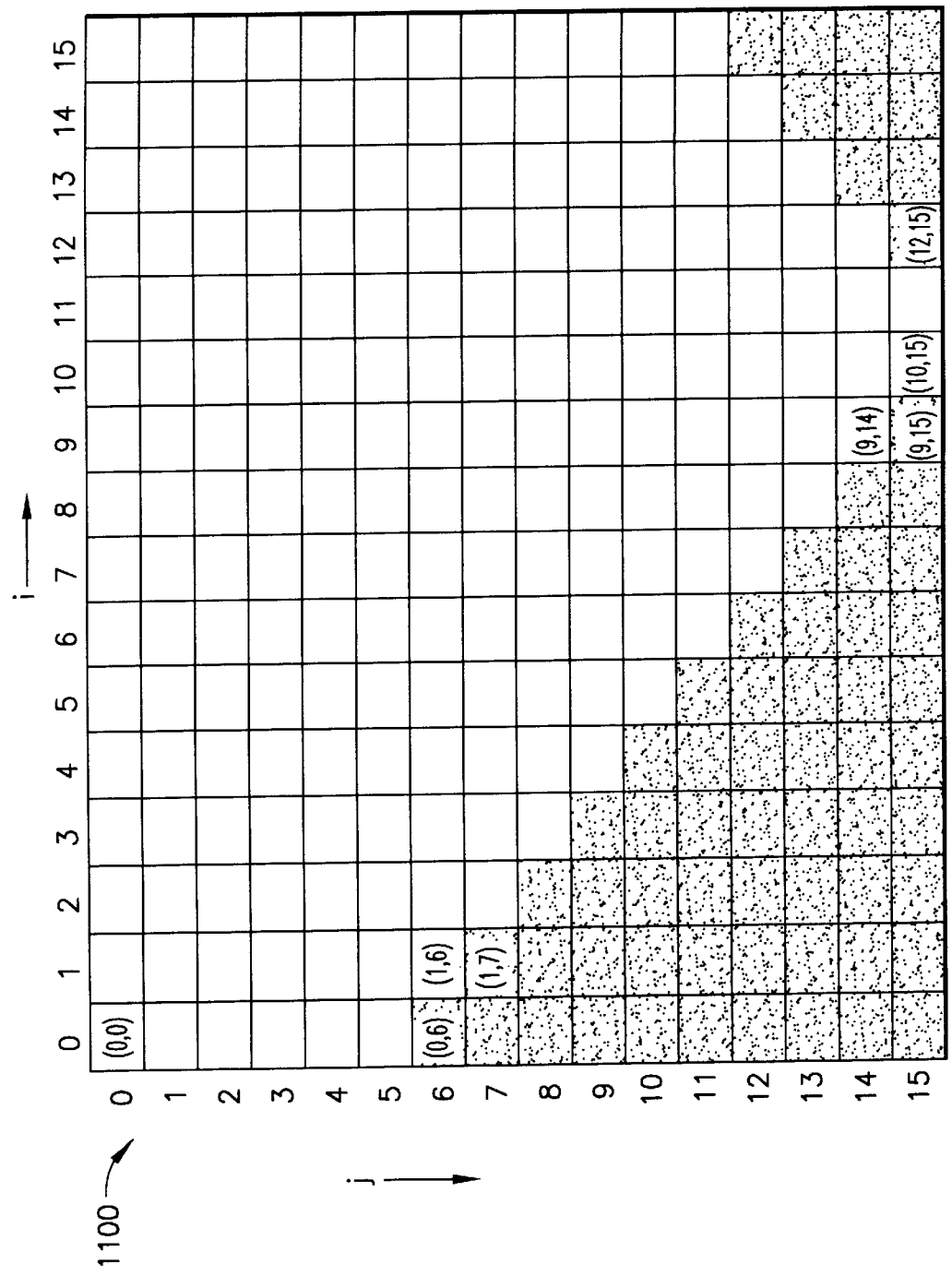
FIG. 11 illustrates repetitive padding within a macroblock for motion prediction in accordance with the present invention.

FIG. 11 illustrates repetitive padding within a macroblock for motion prediction in accordance with the present invention. A block such as a 16×16 luminance macroblock 1100 is shown. Each pixel location is designated by an (i,j) coordinate. The (i,j) coordinate system used in FIGS. 11 and 12 does not necessarily corresponding to (i,j) coordinates or variables used elsewhere in the description. For example, the upper left hand pixel is designated (0,0). Each column of pixels in the macroblock 1100 is numbered from 0 to 15, while each row is also numbered from 0 to 15.

Pixel location which are shaded are part of a VOP. For example, pixels (0,6–15), (1,7–15), (2,8–15), (3,9–15), (4,10–15), (5,11–15), (6,12–15), (7,13–15), (8, 14 and 15), (9,15), (12,15), (13,14 and 15), (14,13–15) and (15,12–15) are part of a VOP. Unshaded (i.e., exterior) pixels are not part of the VOP. Using the padding technique discussed in connection with FIG. 10, the exterior pixels can be padded with boundary (e.g., interior) pixel values of the VOP. For example, exterior pixels (0,0–5) are set to VOP boundary pixel (0,6). Exterior pixel (1,6) is set to the average of boundary pixels (0,6) and (1,7). Exterior pixel (10,15) is set to the average of boundary pixels (9,15) and (12,15). Exterior pixel (9,14) is set to the average of boundary pixels (8,14) and (9,15), and so forth.

Figure 12:
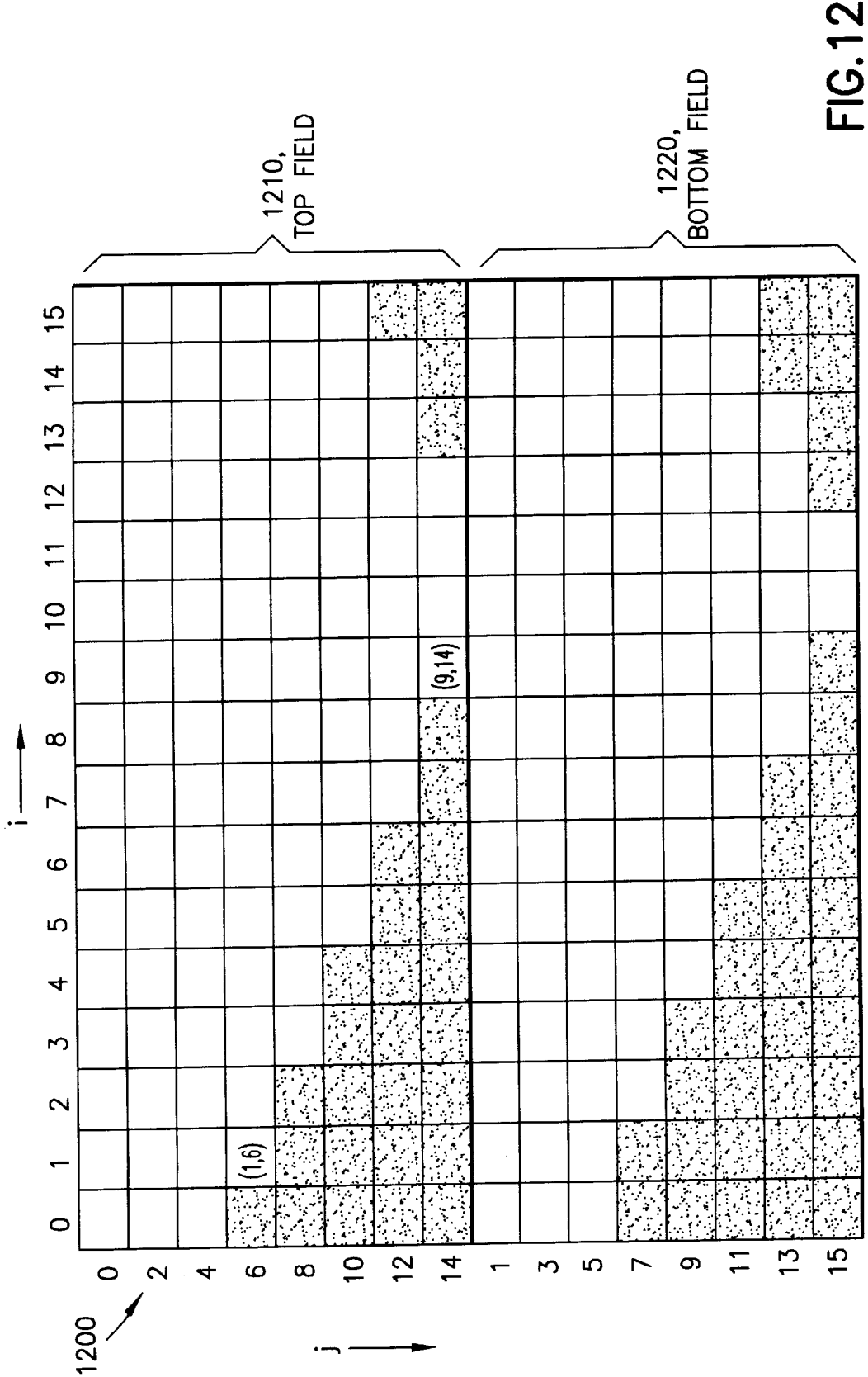
FIG. 12 illustrates repetitive padding within a macroblock for motion prediction after grouping same-field pixel lines in accordance with the present invention.

FIG. 12 illustrates repetitive padding within a macroblock for motion prediction after grouping same-field pixel lines in accordance with the present invention. When VOPs are interlaced coded, a modified padding technique is need for luminance pixel values of a reference VOP used for ME/MC. In accordance with the present invention, the luminance pixel values are split into top and bottom fields, and padding is performed in each field separately. For example, as shown in block 1200, the even rows of pixel data from frame 1100 of FIG. 11 are split into a top field block 1210 (e.g., $VOP_{top}$) and a bottom field block 1220 (e.g., VOP_bottom), each of which is 16×8. Column numbers, indicated by "i", extend from 0–15, while row numbers, indicated by "j", extend from 0, 2, 4, . . . , 14, and from 1, 3, 5, . . . , 15. Each pixel value in the block 1200 can therefore be described by an (i,j) coordinate.

Top field block 1210 includes rows 0, 2, 4, 6, 8, 10, 12 and 14, while bottom field 1220 block includes rows 1, 3, 5, 7, 9, 11, 13 and 15.

Next, each line in the respective blocks is scanned horizontally to provide exterior and interior line segments as discussed previously. For example, (0–8,14) and (13–15,14) are interior line segments, while (9-12,14) is an exterior line segment.

Repetitive padding is then applied separately for each field. For example, in the top field block 1210, exterior pixels (0,0), (0,2) and (0,4) are set to the value of interior pixel (0,6), exterior pixel (9,14) is set to the average of the values of boundary pixels (8,14) and (13,14), exterior pixel (1,6) is set to the average values of boundary pixels (0,6) and (1,8), and so forth. In the bottom field block 1220, exterior pixels (0,1), (0,3) and (0,5) are set to the value of interior pixel (0,7).

Lastly, after padding, the two field blocks 1210 and 1220 are combined to form a single luminance padded reference VOP. That is, the lines are reordered in the interleaved order shown in FIG. 11.

Figure 13:
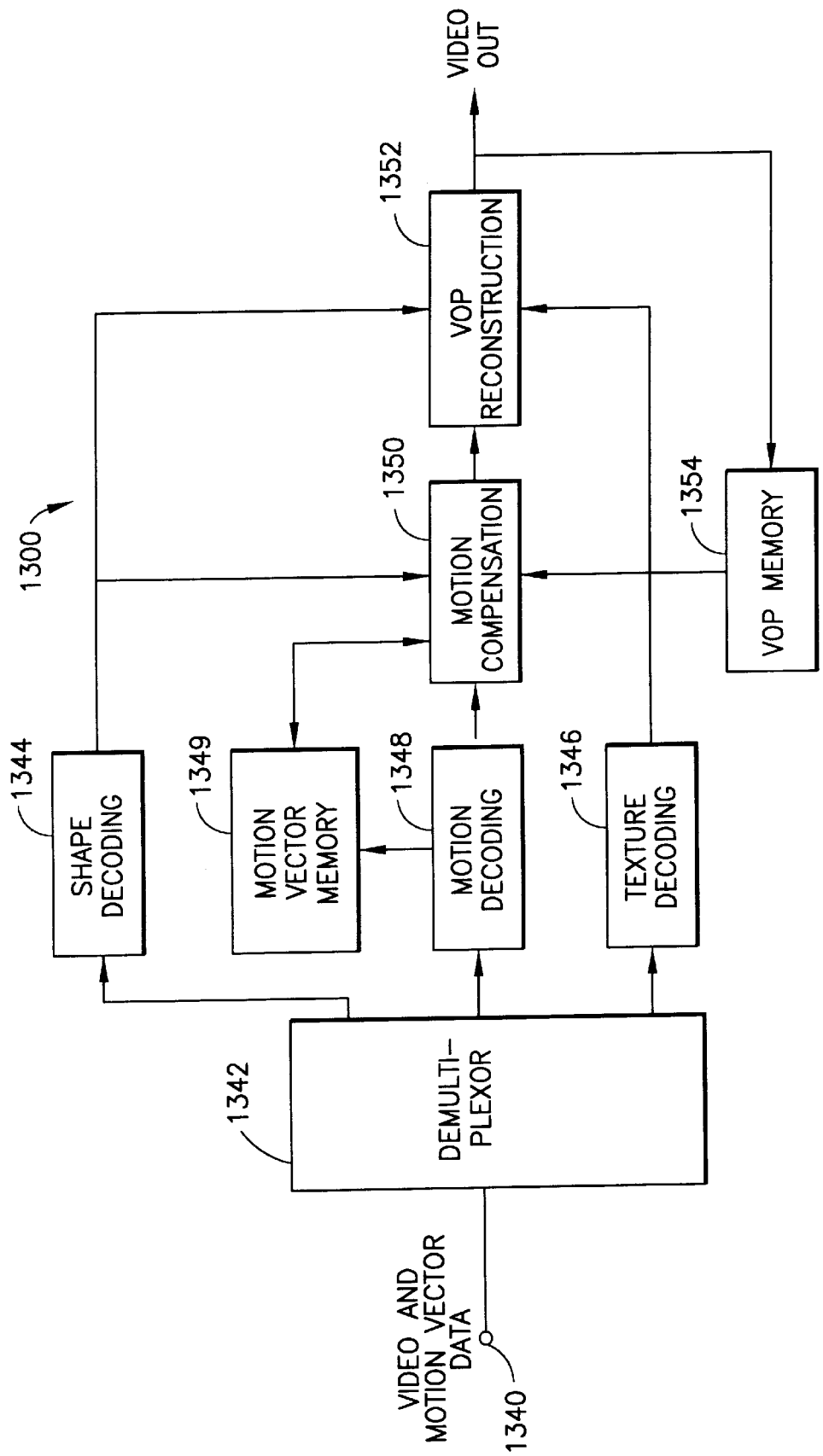
FIG. 13 is a block diagram of a decoder in accordance with the present invention.

FIG. 13 is a block diagram of a decoder in accordance with the present invention. The decoder, shown generally at 1300, can be used to receive and decode the encoded data signals transmitted from the encoder of FIG. 2. The encoded video image data and differentially encoded motion vector data are received at terminal 1340 and provided to a demultiplexer (DEMUX) 1342. The encoded video image data is typically differentially encoded in DCT transform coefficients as a prediction error signal (e.g., residue).

A shape decoding function 1344 processes the data when the VOP has an arbitrary shape to recover shape information, which is, in turn, provided to a motion compensation function 1350 and a VOP reconstruction function 1352. A texture decoding function 1346 performs an inverse DCT on transform coefficients to recover residue information. For INTRA coded macroblocks, pixel information is recovered directly and provided to the VOP reconstruction function 1352. For INTER coded blocks and macroblocks, the pixel information provided from the texture decoding function 1346 to the reconstructed VOP function 1352 represents a residue between the current macroblock and a reference macroblock.

For INTER coded blocks and macroblocks, a motion decoding function 1348 processes the encoded motion vector data to recover the differential motion vectors and provide them to the motion compensation function 1350 and to a motion vector memory 1349, such as a RAM. The motion compensation function 1350 receives the differential motion vector data and determines a reference motion vector (e.g., motion vector predictor) in accordance with the present invention. The reference motion vector is obtained from one or more of the macroblocks which are in a spatial neighborhood of the current macroblock.

For example, when the encoder provides a reference motion vector which is the median of three neighboring macroblocks, the motion compensation function 1350 must re-calculate the median motion vector components (e.g., horizontal and vertical), and sum the median components with the differential motion vector components of the current macroblock to obtain the full motion vector for the current macroblock. The motion compensation function may also need to have circuitry for averaging motion vector components of top and bottom fields of a field coded neighboring macroblock.

Thus, the motion vector memory 1349 is required to store the full motion vectors of the neighboring macroblocks once these full motion vectors are determined. For example, using the scheme disclosed in FIGS. 7–9, the motion vectors of the macroblock which immediately precedes the current macroblock in the current row must be stored, along with preceding row macroblocks which are directly above, and above and to the right, of the current macroblock. For row by row processing of a video frame or VOP, the memory 1349 may need to store up to one row of motion vector data. This can be seen by noting that when the full motion vector for the current macroblock is determined, this value must be stored for use in determining a subsequent reference motion vector since the current macroblock will be a neighboring macroblock in a preceding row when the next row is processed. Furthermore, when the neighboring macroblocks are field coded, motion vector components for both top and bottom fields must be stored.

Once the motion compensation function 1350 determines a full reference motion vector and sums it with the differential motion vector of the current macroblock, the full motion vector of the current macroblock is available. Accordingly, the motion compensation function 1350 can now retrieve anchor frame best match data from a VOP memory 1354, such as a RAM, and provide the anchor frame pixel data to the VOP reconstruction function to reconstruct the current macroblock. In accordance with the present invention, the image quality of the reconstructed macroblock is improve by using the full motion vectors of neighboring macroblocks to determine the reference motion vector.

Padding may also be performed by the motion compensation function 1350. The retrieved best match data is added back to the pixel residue at the VOP reconstruction function 1352 to obtain the decoded current macroblock or block. The reconstructed block is output as a video output signal and also provided to the VOP memory 1354 to provide new anchor frame data. Note that an appropriate video data buffering capability may be required depending on the frame transmission and presentation orders since the anchor frame for P-VOPs is the temporally future frame in presentation order.

Generally, the decoder will perform the same steps as the encoder to determine the median or other value which was used as the motion vector predictor for the current VOP or block. Alternatively, when the motion vector predictor is the same as the motion vector of one of the candidate macroblocks, it is possible to transmit a code word to the decoder which designates the particular macroblock. For example, a code 00 may mean the motion vector of the previous block in the same row was used, a code 01 may mean the motion vector of the block above the current block in the previous row was used, and a code 10 may mean the motion vector of the next block in the previous row was used. In this case, the decoder can directly use the motion vector predictor of the designated macroblock and need not access the motion vectors of each of the candidate macroblocks to recalculate the motion vector predictor. A code of 11 may mean that the motion vector predictor is different than the motion vectors of all of the candidate macroblocks, so the decoder must recalculate the motion vector predictor. Those skilled in the art will appreciate that the necessary operations can be implemented in software, firmware or hardware. This processing can be implemented with a relatively low cost and low complexity.

Figure 14:
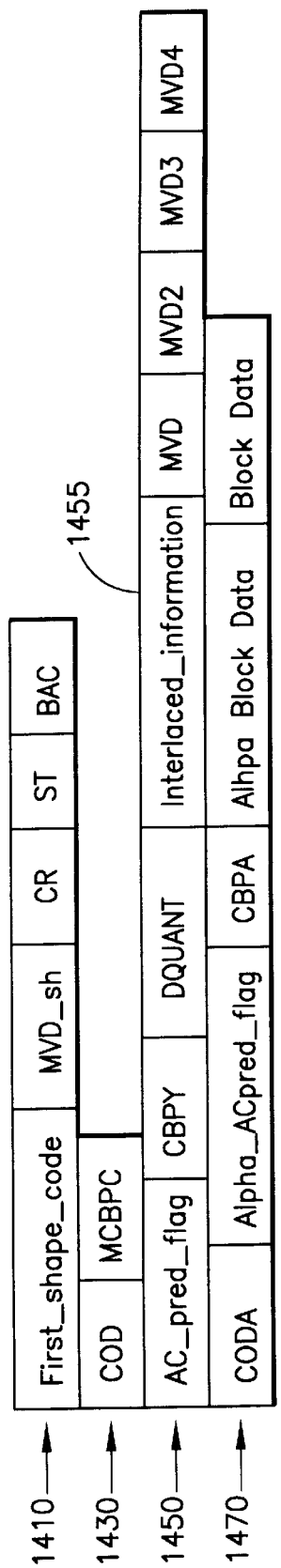
FIG. 14 illustrates a macroblock layer structure in accordance with the present invention.

FIG. 14 illustrates a macroblock layer structure in accordance with the present invention. The structure is suitable for P-VOPs, and indicates the format of data received by the decoder. A first layer 1410 includes fields first_shape code, MVD_sh, CR, ST and BAC. A second layer 1430 includes fields COD and MCBPC. A third layer 1450 includes fields AC_pred_flag, CBPY, DQUANT, Interlaced_information, MVD, MVD2, MVD3 and MVD4. A fourth layer includes fields CODA, Alpha_ACpred_flag, CBPA, Alpha Block Data and Block Data. Each of the above fields is defined according to the MPEG-4 standard.

The field Interlaced_information in the third layer 1450 indicates whether a macroblock is interlaced coded, and provides field motion vector reference data which informs the decoder of the coding mode of the current macroblock or block. The decoder uses this information in calculating the motion vector for a current macroblock. For example, if the current macroblock is not interlaced coded but at least one of the reference macroblocks is, then the decoder will average the motion vector components of each of the interlaced coded reference macroblocks for use in determining a reference motion vector for the current macroblock. Alternatively, the motion vector from the top or bottom field in the reference macroblock is used, but not both. If the current macroblock is interlaced coded, then the decoder will know to calculate a reference motion vector separately for each field. The coding mode may also designate which of the candidate macroblocks, if any, has a motion vector which is the same as the reference motion vector used in differentially encoding the motion vector of the current macroblock.

The Interlaced_information field may be stored for subsequent use as required in the motion vector memory 1349 or other memory in the decoder.

The Interlaced_information field may also include a flag dct_type which indicates whether top and bottom field pixel lines in a field coded macroblock are reordered from the interleaved order, e.g., for padding.

It will be appreciated that the arrangement shown in FIG. 14 is an example only and that various other arrangements for communicating the relevant information to the decoder will become apparent to those skilled in the art.

A bitstream syntax for use in accordance with the present invention is now described. MPEG-4 provides a video syntax with a class hierarchy, including a Video Session (VS), Video Object (VO), Video Object Layer (VOL) or Texture Object Layer (SOL), Group of Video Object Plane, and at the bottom, a Video Object Plane. The Video Object Plane Layer syntax, set forth below, can indicate whether a current macroblock is interlaced coded in accordance with the present invention as shown below. The syntax which is not shaded is part of the present invention (e.g., interlaced; if (interlaced) and top_field_first). Here, the term "interlaced"=1 if the current macroblock is interlaced coded. The term "top_field_first" indicates that the top field of the current macroblock is to be processed first. Other terms are defined in the aforementioned "MPEG-4 Video Verification Model Version 7.0". Only a portion of the conventional syntax is shown for compactness, with the omitted portions being designated by three vertically arranged dots.

| Syntax | No. of bits |
|---|---|
| VideoObjectPlane( ) { | |
|   VOP_start_code | sc+8=32 |
|   do { | |
|     modulo_time_base | 1 |
|   } while ( modulo_time_base != "0") | |
|   VOP_time_increment | 10 |
|   VOP_prediction_type | 2 |
|     background_composition | 1 |
|     VOP_CR | 1–2 |
|     change_CR_disable | 1 |
|   } | |
|   disable_sadct | 1 |

| Syntax | No. of bits |
|---|---|
| interlaced | 1 |
| if (interlaced) | |
|   top_field_first | 1 |
|   if (VOP_prediction_type = = '10') | |
|     VOP_dbquant | 2 |
| | 6 |
|     forward_temporal_ref | 10 |
|     if (VOP_prediction_type = = '10') { | |
|       marker_bit | 1 |
|       backward_temporal_ref | 10 |
|     } | |
|   } | |
|     combined_motion_shape_texture_coding( ) | |
| } | |
| next_start_code( ) | |
| } | |

A more detailed macroblock layer syntax in accordance with the present invention when the A more detailed macroblock layer syntax in accordance with the present invention when the Interlaced_information field=1 is shown below. field_prediction=1 if the current macroblock is interlaced predicted. The referenced field flags have a value of zero for the top field and a value one for the bottom field. For P-VOPs, when field_prediction=1, two motion vector differences follow the syntax, with the top field motion vector followed by the bottom field motion vector.

The syntax also accounts for B-VOPs. In particular, for B-VOPS, when field_prediction=1, two or four motion vector differences are encoded. The order of motion vector differences for an interpolated macroblock is top field forward, bottom field forward, top field backward, and bottom field backward. For unidirectional interlaced prediction (e.g., forward or backward only), the top field motion vector difference is followed by the bottom field motion vector difference.

| Syntax | No. of bits | Format |
|---|---|---|
| if (interlaced) { | | |
|   if ((mbtype == INTRA) \|\| | | |
|     (mbtype == INTRA_Q) \|\| | | |
|     (cbp != 0)) | | |
|     dct_type | 1 | |
|   if ((P_VOP && ((mbtype == INTER) \|\| | | uimbsf |
|     (mbtype == INTER_Q))) \|\| | | |
|     (B_VOP && (mbtype != Direct_mode))) { | | |
|     field_prediction | 1 | |
|     if (field_prediction) { | | uimbsf |
|       if (P_VOP \|\| | | |
|         (B_VOP && (mbtype != Backward))) { | | |
|         forward_top_field_reference | 1 | |
|         forward_bottom_field_reference | 1 | uimbsf |
|       } | | uimbsf |
|       if (B-VOP && (mbtype != Forward)) { | 1 | uimbsf |
|         backward_top_field_reference | | uimbsf |
|         backward_bottom_field_reference | | |
|       } | | |
|     } | | |
|   } | | |
| } | | |

Accordingly, it can be seen that the present invention provides a method and apparatus for coding of digital video images such as video object planes (VOPs), and, in particular, to motion estimation and compensation techniques for interlaced digital video. A technique for providing predictor motion vectors for use in differentially encoding a current field predicted macroblock uses the median of motion vectors of surrounding blocks or macroblocks. When a surrounding macroblock is itself interlaced coded, an average motion vector for that macroblock can be used, with fractional pixel values being mapped to the half-pixel. When the current block is not interlaced coded but a surrounding block is, the field motion vectors of the surrounding block may be used individually or averaged.

A decoder in accordance with the present invention uses a bitstream syntax to determine the coding mode of a macroblock, e.g., such as whether a macroblock is field coded. The decoder may store the coding mode of neighboring macroblocks for later use.

In a repetitive padding technique for an interlaced coded VOP, the top and bottom lines of the VOP and surrounding block are grouped. Within each field, exterior pixels are padded by setting them to the value of the nearest boundary pixel, or to an average of two boundary pixels. The lines are then reordered to provide a single reference VOP image.

Although the invention has been described in connection with various specific embodiments, those skilled in the art will appreciate that numerous adaptations and modifications may be made thereto without departing from the spirit and scope of the invention as set forth in the claims.

What is claimed is:

1. A method for providing horizontal and vertical motion vector components for use in differentially encoding respective horizontal and vertical motion vector components of a current block of a digital video image, wherein:

candidate first, second and third blocks have associated horizontal and vertical motion vector components;

said first block being at least a portion of a first macroblock which immediately precedes said current block in a current row;

said second block being at least a portion of a second macroblock which is immediately above said current block in a preceding row;

said third block being at least a portion of a third macroblock which immediately follows said second macroblock in said preceding row; and at least one of said first, second and third candidate blocks and said current block is field-coded;

said method comprising at least one of the steps of:

(a) selecting a horizontal motion vector component for use in differentially encoding the horizontal motion vector component of said current block according to a value derived from the horizontal motion vector components of said first, second and third candidate blocks; and (b) selecting a vertical motion vector component for use in differentially encoding the vertical motion vector component of said current block according to a value derived from the vertical motion vector components of said first, second and third candidate blocks.

2. The method of claim 1, wherein at least a particular one of said first, second and third macroblocks comprises a plurality of blocks, each of which have associated horizontal and vertical motion vector components suitable for use in differentially encoding said motion vector components of said current block, said method comprising the further step of:

selecting one of said plurality of blocks in said particular macroblock which is closest to an upper left-hand portion of said current block as the candidate block of said particular macroblock.

3. The method of claim 1, comprising the further step of:

providing data for transmission with said at least one differentially encoded motion vector component indicating whether said current block is field coded.

4. The method of claim 1, wherein:

said current block is a progressive-coded or advanced prediction-coded block; and at least one of said candidate blocks is a field coded candidate macroblock having first and second fields, each with respective horizontal and vertical motion vector components.

5. The method of claim 4, wherein:

said horizontal motion vector component selecting step makes a selection according to a median of the horizontal motion vector components of said candidate blocks, including said corresponding horizontal motion vector components of said first and second fields of said at least one field coded candidate macroblock; and said vertical motion vector component selecting step makes a selection according to a median of the vertical motion vector components of said candidate blocks, including said corresponding vertical motion vector components of said first and second fields of said at least one field coded candidate macroblock.

6. The method of claim 4, comprising the further steps of:

averaging the respective first and second field horizontal motion vector components of the at least one field coded candidate macroblock to obtain at least one corresponding averaged horizontal motion vector component;

wherein said horizontal motion vector component selecting step makes a selection according to a median of the horizontal motion vector components of said candidate blocks other than said at least one field coded candidate macroblock, if any, and said at least one corresponding averaged horizontal motion vector component; and averaging the respective first and second field vertical motion vector components of the at least one field coded candidate macroblock to obtain at least one corresponding averaged vertical motion vector component; wherein:

said vertical motion vector component selecting step makes a selection according to a median of the vertical motion vector components of said candidate blocks other than said at least one field coded candidate macroblock, if any, and said at least one corresponding averaged vertical motion vector component.

7. The method of claim 6, wherein:

the first and second field horizontal motion vector components of the at least one field coded candidate macroblock are averaged such that all fractional pixel offsets are mapped to a half-pixel displacement; and the first and second field vertical motion vector components of the at least one field coded candidate macroblock are averaged such that all fractional pixel offsets are mapped to a half-pixel displacement.

8. The method of claim 1, wherein said current block is a field coded macroblock having first and second fields, each with respective horizontal and vertical motion vector components, said method comprising the further steps of:

selecting a horizontal motion vector component for use in differentially encoding said horizontal motion vector components of said first and second fields of said current field coded macroblock according to a value derived from the horizontal motion vector components of said first, second and third candidate blocks; and selecting a vertical motion vector component for use in differentially encoding said vertical motion vector components of said first and second fields of said current field coded macroblock according to a value derived from the vertical motion vector components of said first, second and third candidate blocks.

9. The method of claim 8, wherein at least one of said candidate blocks is a field coded candidate macroblock having first and second fields, each with respective horizontal and vertical motion vector components.

10. The method of claim 9, wherein:

said horizontal motion vector component selecting step makes a selection for encoding said horizontal motion vector component of said first field of said current macroblock according to a median of (i) the horizontal motion vector components of said candidate blocks other than said at least one field coded candidate macroblock, if any, and (ii) the horizontal motion vector components of the first field of said least one field coded candidate macroblock;

said horizontal motion vector component selecting step makes a selection for encoding said horizontal motion vector component of said second field of said current macroblock according to a median of (i) the horizontal motion vector components of said candidate blocks other than said at least one field coded candidate macroblock, if any, and (ii) the horizontal motion vector components of the second field of said at least one field coded candidate macroblock;

said vertical motion vector component selecting step makes a selection for encoding said vertical motion vector component of said first field of said current macroblock is determined according to a median of (i) the vertical motion vector components of said candidate blocks other than said at least one field coded candidate macroblock, if any, and (ii) the vertical motion vector components of the first field of said least one field coded candidate macroblock; and said vertical motion vector component selection step makes a selection for encoding said vertical motion vector component of said second field of said current macroblock is determined according to a median of (i) the vertical motion vector components of said candidate blocks other than said at least one field coded candidate macroblock, if any, and (ii) the vertical motion vector components of the second field of said at least one field coded candidate macroblock.

11. The method of claim 9, comprising the further steps of:

averaging the respective first and second field horizontal motion vector components of the at least one field coded candidate macroblock to obtain at least one corresponding averaged horizontal motion vector component; wherein:

the selected horizontal motion vector component for use in differentially encoding the horizontal motion vector component(s) of at least one of said first and second fields of said current macroblock is determined according to a median of (i) the horizontal motion vector components of said candidate blocks other than said at least one field coded candidate macroblock, if any, and (ii) said at least one corresponding averaged horizontal motion vector component; and averaging the respective first and second field vertical motion vector components of the at least one field coded candidate macroblock to obtain at least one corresponding averaged vertical motion vector component; wherein:

the selected vertical motion vector component for use in differentially encoding the vertical motion vector component(s) of at least one of said first and second fields of said current macroblock is determined according to a median of (i) the vertical motion vector components of said candidate blocks other than said at least one field coded candidate macroblock, if any, and (ii) said at least one corresponding averaged vertical motion vector component.

12. The method of claim 11, wherein:

the first and second field horizontal motion vector components of the at least one field coded candidate macroblock are averaged such that all fractional pixel offsets are mapped to a half-pixel displacement; and the first and second field vertical motion vector components of the at least one field coded candidate macroblock are averaged such that all fractional pixel offsets are mapped to a half-pixel displacement.

13. A method for decoding a current block of digital video image data, said current block having associated differentially encoded horizontal and vertical motion vector components, comprising at least one of the steps of:

(a) determining a horizontal motion vector component used in differentially encoding said horizontal motion vector component of said current block according to a value based on horizontal motion vector components of first, second and third candidate blocks; and (b) determining a vertical motion vector component used in differentially encoding a vertical motion vector component of said current block according to a value based on vertical motion vector components of said first, second and third candidate blocks; wherein:

said first block is at least a portion of a first macroblock which immediately precedes said current block in a current row;

said second block is at least a portion of a second macroblock which is immediately above said current block in a preceding row;

said third block is at least a portion of a third macroblock which immediately follows said second macroblock in said preceding row; and at least one of said first, second and third candidate blocks and said current block is field coded.

14. The method of claim 13, wherein:

said current block is a progressive-coded or advanced prediction-coded block; and at least one of said candidate blocks is a field coded candidate macroblock having first and second fields, each with respective horizontal and vertical motion vector components.

15. The method of claim 14, wherein:

the horizontal motion vector component used in encoding the horizontal motion vector component of said first field of said current macroblock is determined according to a median of (i) the horizontal motion vector components of said candidate blocks other than said at least one field coded candidate macroblock, if any, and (ii) the horizontal motion vector components of the first field of said least one field coded candidate macroblock;

the horizontal motion vector component used in encoding the horizontal motion vector component of said second field of said current macroblock is determined according to a median of (i) the horizontal motion vector components of said candidate blocks other than said at least one field coded candidate macroblock, if any, and (ii) the horizontal motion vector components of the second field of said at least one field coded candidate macroblock;

the vertical motion vector component used in encoding the vertical motion vector component of said first field of said current macroblock is determined according to a median of (i) the vertical motion vector components of said candidate blocks other than said at least one field coded candidate macroblock, if any, and (ii) the vertical motion vector components of the first field of said least one field coded candidate macroblock; and the vertical motion vector component used in encoding the vertical motion vector component of said second field of said current macroblock is determined according to a median of (i) the vertical motion vector components of said candidate blocks other than said at least one field coded candidate macroblock, if any, and (ii) the vertical motion vector components of the second field of said at least one field coded candidate macroblock.

16. The method of claim 14, comprising the further steps of:

averaging the respective first and second field horizontal motion vector components of the at least one field coded candidate macroblock to obtain at least one corresponding averaged horizontal motion vector component; wherein:

the horizontal motion vector component used in differentially encoding the horizontal motion vector component(s) of at least one of said first and second fields of said current macroblock is determined according to a median of (i) the horizontal motion vector components of said candidate blocks other than said at least one field coded candidate macroblock, if any, and (ii) said at least one corresponding averaged horizontal motion vector component; and averaging the respective first and second field vertical motion vector components of the at least one field coded candidate macroblock to obtain at least one corresponding averaged vertical motion vector component; wherein:

the vertical motion vector component used in differentially encoding the vertical motion vector component(s) of at least one of said first and second fields of said current macroblock is determined according to a median of (i) the vertical motion vector components of said candidate blocks other than said at least one field coded candidate macroblock, if any, and (ii) said at least one corresponding averaged vertical motion vector component.

17. The method of claim 16, wherein:

the first and second field horizontal motion vector components of the at least one field coded candidate macroblock are averaged such that all fractional pixel offsets are mapped to a half-pixel displacement; and the first and second field vertical motion vector components of the at least one field coded candidate macroblock are averaged such that all fractional pixel offsets are mapped to a half-pixel displacement.

18. The method of claim 13, wherein said current block is a field coded macroblock having first and second fields, each with respective horizontal and vertical motion vector components, said method comprising the further steps of:

determining a horizontal motion vector component used in differentially encoding said horizontal motion vector components of said first and second fields of said current field coded macroblock according to a value based on the horizontal motion vector components of said first, second and third candidate blocks; and determining a vertical motion vector component used in differentially encoding said vertical motion vector components of said first and second fields of said current field coded macroblock according to a value based on the vertical motion vector components of said first, second and third candidate blocks.

19. The method of claim 18, wherein at least one of said candidate blocks is a field coded macroblock having first and second fields, each with respective horizontal and vertical motion vector components.

20. The method of claim 19, wherein:

the horizontal motion vector component used in differentially encoding said horizontal motion vector components of at least one of said first and second fields of said current field coded macroblock is determined according to a median of the horizontal motion vector components of said candidate blocks, including said corresponding horizontal motion vector components of said first and second fields of said at least one field coded candidate macroblock; and said vertical motion vector component used in differentially encoding said vertical motion vector components of at least one of said first and second fields of said current field coded macroblock is determined according to a median of the vertical motion vector components of said candidate blocks, including said corresponding vertical motion vector components of said first and second fields of said at least one field coded candidate macroblock.

21. The method of claim 19, comprising the further steps of:

averaging the respective first and second field horizontal motion vector components of the at least one field coded candidate macroblock to obtain at least one corresponding averaged horizontal motion vector component;

wherein said horizontal motion vector component used in differentially encoding said horizontal motion vector components of said first and second fields of said current field coded macroblock is determined according to a median of the horizontal motion vector components of said candidate blocks other than said at least one field coded candidate macroblock, if any, and said at least one corresponding averaged horizontal motion vector component; and averaging the respective first and second field vertical motion vector components of the at least one field coded candidate macroblock to obtain at least one corresponding averaged vertical motion vector component; wherein:

said vertical motion vector component used in differentially encoding said vertical motion vector components of said first and second fields of said current field coded macroblock is determined according to a median of the vertical motion vector components of said candidate blocks other than said at least one field coded candidate macroblock, if any, and said at least one corresponding averaged vertical motion vector component.

22. The method of claim 21, wherein:

the first and second field horizontal motion vector components of the at least one field coded candidate macroblock are averaged such that all fractional pixel offsets are mapped to a half-pixel displacement; and the first and second field vertical motion vector components of the at least one field coded candidate macroblock are averaged such that all fractional pixel offsets are mapped to a half-pixel displacement.

23. The method of claim 13, wherein:

the horizontal motion vector component used in differentially encoding said horizontal motion vector component of said current block is determined according to a median of the horizontal motion vector components of said first, second and third candidate blocks; and the vertical motion vector component used in differentially encoding said vertical motion vector component of said current block is determined according to a median of the vertical motion vector components of said first, second and third candidate blocks.

24. The method of claim 13, comprising the further step of:

decoding said candidate first, second and third blocks to recover said horizontal and vertical motion vector components associated therewith.

25. The method of claim 13, comprising the further step of:

recovering transmitted data with said at least one differentially encoded motion vector component indicating whether said current block is field coded.

26. The method of claim 25, wherein:

said coding mode designates the motion vector components of one of said candidate first, second and third blocks as being the same as the motion vector components used in differentially encoding the motion vector components of said current block.

27. The method of claim 13, wherein said digital video image comprises macroblocks which are processed row by row, comprising the further steps of:

processing said second and third macroblocks in said preceding row to recover said horizontal and vertical motion vector components associated therewith;

storing said horizontal and vertical motion vector components associated with said second and third macroblocks;

processing said first macroblock in said current row to recover said horizontal and vertical motion vector components associated therewith; and subsequently retrieving said horizontal and vertical motion vector components associated with said second and third macroblocks for use in said at least one of said determining steps.

28. An apparatus for providing horizontal and vertical motion vector components for use in differentially encoding respective horizontal and vertical motion vector components of a current block of a digital video image, wherein:

candidate first, second and third blocks have associated horizontal and vertical motion vector components;

said first block being at least a portion of a first macroblock which immediately precedes said current block in a current row;

said second block being at least a portion of a second macroblock which is immediately above said current block in a preceding row;

said third block being at least a portion of a third macroblock which immediately follows said second macroblock in said preceding row; and at least one of said first, second and third candidate blocks and said current block is field coded;

said apparatus comprising at least one of:

(a) means for selecting a horizontal motion vector component for use in differentially encoding the horizontal motion vector component of said current block according to a value derived from the horizontal motion vector components of said first, second and third candidate blocks; and (b) means for selecting a vertical motion vector component for use in differentially encoding the vertical motion vector component of said current block according to a value derived from the vertical motion vector components of said first, second and third candidate blocks.

29. The apparatus of claim 28, wherein at least a particular one of said first, second and third macroblocks comprises a plurality of blocks, each of which have associated horizontal and vertical motion vector components suitable for use in differentially encoding said motion vector components of said current block, said apparatus further comprising:

means for selecting one of said plurality of blocks in said particular macroblock which is closest to an upper left-hand portion of said current block as the candidate block of said particular macroblock.

30. The apparatus of claim 28, further comprising:

means for providing data for transmission with said at least one differentially encoded motion vector component indicating whether said current block is field coded.

31. The apparatus of claim 28, wherein:

said current block is a progressive-coded or advanced prediction-coded block; and at least one of said candidate blocks is a field coded candidate macroblock having first and second fields, each with respective horizontal and vertical motion vector components.

32. The apparatus of claim 31, wherein:

said means for selecting a horizontal motion vector component makes a selection according to a median of the horizontal motion vector components of said candidate blocks, including said corresponding horizontal motion vector components of said first and second fields of said at least one field coded candidate macroblock; and said means for selecting a vertical motion vector component makes a selection according to a median of the vertical motion vector components of said candidate blocks, including said corresponding vertical motion vector components of said first and second fields of said at least one field coded candidate macroblock.

33. The apparatus of claim 31, further comprising:

means for averaging the respective first and second field horizontal motion vector components of the at least one field coded candidate macroblock to obtain at least one corresponding averaged horizontal motion vector component;

wherein said means for selecting a horizontal motion vector component makes a selection according to a median of the horizontal motion vector components of said candidate blocks other than said at least one field coded candidate macroblock, if any, and said at least one corresponding averaged horizontal motion vector component; and means for averaging the respective first and second field vertical motion vector components of the at least one field coded candidate macroblock to obtain at least one corresponding averaged vertical motion vector component; wherein:

said means for selecting a vertical motion vector component makes a selection according to a median of the vertical motion vector components of said candidate blocks other than said at least one field coded candidate macroblock, if any, and said at least one corresponding averaged vertical motion vector component.

34. The apparatus of claim 33, wherein:

the first and second field horizontal motion vector components of the at least one field coded candidate macroblock are averaged such that all fractional pixel offsets are mapped to a half-pixel displacement; and the first and second field vertical motion vector components of the at least one field coded candidate macroblock are averaged such that all fractional pixel offsets are mapped to a half-pixel displacement.

35. The apparatus of claim 28, wherein:

said current block is a field coded macroblock having first and second fields, each with respective horizontal and vertical motion vector components;

said horizontal motion vector component selecting means selects a horizontal motion vector component for use in differentially encoding said horizontal motion vector components of said first and second fields of said current field coded macroblock according to a value derived from the horizontal motion vector components of said first, second and third candidate blocks; and said vertical motion vector component selecting means selects a vertical motion vector component for use in differentially encoding said vertical motion vector components of said first and second fields of said current field coded macroblock according to a value derived from the vertical motion vector components of said first, second and third candidate blocks.

36. The apparatus of claim 35, wherein:

at least one of said candidate blocks is a field coded candidate macroblock having first and second fields, each with respective horizontal and vertical motion vector components.

37. The apparatus of claim 36, wherein:

said means for selecting a horizontal motion vector component makes a selection for encoding said horizontal motion vector component of said first field of said current macroblock according to a median of (i) the horizontal motion vector components of said candidate blocks other than said at least one field coded candidate macroblock, if any, and (ii) the horizontal motion vector components of the first field of said at least one field coded candidate macroblock;

said means for selecting a horizontal motion vector component makes a selection for encoding said horizontal motion vector component of said second field of said current macroblock according to a median of (i) the horizontal motion vector components of said candidate blocks other than said at least one field coded candidate macroblock, if any, and (ii) the horizontal motion vector components of the second field of said at least one field coded candidate macroblock;

said means for selecting a vertical motion vector component makes a selection for encoding said vertical motion vector component of said first field of said current macroblock according to a median of (i) the vertical motion vector components of said candidate blocks other than said at least one field coded candidate macroblock, if any, and (ii) the vertical motion vector components of the first field of said least one field coded candidate macroblock; and said means for selecting a vertical motion vector component makes a selection for encoding said vertical motion vector component of said second field of said current macroblock according to a median of (i) the vertical motion vector components of said candidate blocks other than said at least one field coded candidate macroblock, if any, and (ii) the vertical motion vector components of the second field of said at least one field coded candidate macroblock.

38. The apparatus of claim 36, further comprising:

means for averaging the respective first and second field horizontal motion vector components of the at least one field coded candidate macroblock to obtain at least one corresponding averaged horizontal motion vector component; wherein:

the selected horizontal motion vector component for use in differentially encoding the horizontal motion vector component(s) of at least one of said first and second fields of said current macroblock is determined according to a median of (i) the horizontal motion vector components of said candidate blocks other than said at least one field coded candidate macroblock, if any, and (ii) said at least one corresponding averaged horizontal motion vector component; and means for averaging the respective first and second field vertical motion vector components of the at least one field coded candidate macroblock to obtain at least one corresponding averaged vertical motion vector component; wherein:

the selected vertical motion vector component for use in differentially encoding the vertical motion vector component(s) of at least one of said first and second fields of said current macroblock is determined according to a median of (i) the vertical motion vector components of said candidate blocks other than said at least one field coded candidate macroblock, if any, and (ii) said at least one corresponding averaged vertical motion vector component.

39. The apparatus of claim 38, wherein:

the first and second field horizontal motion vector components of the at least one field coded candidate macroblock are averaged such that all fractional pixel offsets are mapped to a half-pixel displacement; and the first and second field vertical motion vector components of the at least one field coded candidate macroblock are averaged such that all fractional pixel offsets are mapped to a half-pixel displacement.

40. An apparatus for decoding a current block of digital video image data, said current block having associated differentially encoded horizontal and vertical motion vector components, comprising at least one of:

(a) means for determining a horizontal motion vector component used in differentially encoding said horizontal motion vector component of said current block according to a value based on horizontal motion vector components of first, second and third candidate blocks; and (b) means for determining a vertical motion vector component used in differentially encoding a vertical motion vector component of said current block according to a value based on vertical motion vector components of said first, second and third candidate blocks; wherein:

said first block is at least a portion of a first macroblock which immediately precedes said current block in a current row;

said second block is at least a portion of a second macroblock which is immediately above said current block in a preceding row;

said third block is at least a portion of a third macroblock which immediately follows said second macroblock in said preceding row; and at least one of said first, second and third candidate blocks and said current block is field coded.

41. The apparatus of claim 40, wherein:

said current block is a progressive-coded or advanced prediction-coded block; and at least one of said candidate blocks is a field coded candidate macroblock having first and second fields, each with respective horizontal and vertical motion vector components.

42. The apparatus of claim 41, wherein:

the horizontal motion vector component used in encoding the horizontal motion vector component of said first field of said current macroblock is determined according to a median of (i) the horizontal motion vector components of said candidate blocks other than said at least one field coded candidate macroblock, if any, and (ii) the horizontal motion vector components of the first field of said least one field coded candidate macroblock;

the horizontal motion vector component used in encoding the horizontal motion vector component of said second field of said current macroblock is determined according to a median of (i) the horizontal motion vector components of said candidate blocks other than said at least one field coded candidate macroblock, it any, and (ii) the horizontal motion vector components of the second field of said at least one field coded candidate macroblock;

the vertical motion vector component used in encoding the vertical motion vector component of said first field of said current macroblock is determined according to a median of (i) the vertical motion vector components of said candidate blocks other than said at least one field coded candidate macroblock, if any, and (ii) the vertical motion vector components of the first field of said least one field coded candidate macroblock; and the vertical motion vector component used in encoding the vertical motion vector component of said second field of said current macroblock is determined according to a median of (i) the vertical motion vector components of said candidate blocks other than said at least one field coded candidate macroblock, if any, and (ii) the vertical motion vector components of the second field of said at least one field coded candidate macroblock.

43. The apparatus of claim 41, further comprising:

means for averaging the respective first and second field horizontal motion vector components of the at least one field coded candidate macroblock to obtain at least one corresponding averaged horizontal motion vector component; wherein:

the horizontal motion vector component used in differentially encoding the horizontal motion vector component(s) of at least one of said first and second fields of said current macroblock is determined according to a median of (i) the horizontal motion vector components of said candidate blocks other than said at least one field coded candidate macroblock, if any, and (ii) said at least one corresponding averaged horizontal motion vector component; and means for averaging the respective first and second field vertical motion vector components of the at least one field coded candidate macroblock to obtain at least one corresponding averaged vertical motion vector component; wherein:

the vertical motion vector component used in differentially encoding the vertical motion vector component(s) of at least one of said first and second fields of said current macroblock is determined according to a median of (i) the vertical motion vector components of said candidate blocks other than said at least one field coded candidate macroblock, if any, and (ii) said at least one corresponding averaged vertical motion vector component.

44. The apparatus of claim 43, wherein:

the first and second field horizontal motion vector components of the at least one field coded candidate macroblock are averaged such that all fractional pixel offsets are mapped to a half-pixel displacement; and the first and second field vertical motion vector components of the at least one field coded candidate macroblock are averaged such that all fractional pixel offsets are mapped to a half-pixel displacement.

45. The apparatus of claim 40, wherein said current block is a field coded macroblock having first and second fields, each with respective horizontal and vertical motion vector components, said apparatus further comprising:

means for determining a horizontal motion vector component used in differentially encoding said horizontal motion vector components of said first and second fields of said current field coded macroblock according to a value based on the horizontal motion vector components of said first, second and third candidate blocks; and means for determining a vertical motion vector component used in differentially encoding said vertical motion vector components of said first and second fields of said current field coded macroblock according to a value based on the vertical motion vector components of said first, second and third candidate blocks.

46. The apparatus of claim 45, wherein at least one of said candidate blocks is a field coded macroblock having first and second fields, each with respective horizontal and vertical motion vector components.

47. The apparatus of claim 46, wherein:

the horizontal motion vector component used in differentially encoding said horizontal motion vector components of at least one of said first and second fields of said current field coded macroblock is determined according to a median of the horizontal motion vector components of said candidate blocks, including said corresponding horizontal motion vector components of said first and second fields of said at least one field coded candidate macroblock; and said vertical motion vector component used in differentially encoding said vertical motion vector components of at least one of said first and second fields of said current field coded macroblock is determined according to a median of the vertical motion vector components of said candidate blocks, including said corresponding vertical motion vector components of said first and second fields of said at least one field coded candidate macroblock.

48. The apparatus of claim 46, further comprising:

means for averaging the respective first and second field horizontal motion vector components of the at least one field coded candidate macroblock to obtain at least one corresponding averaged horizontal motion vector component;

wherein said horizontal motion vector component used in differentially encoding said horizontal motion vector components of said first and second fields of said current field coded macroblock is determined according to a median of the horizontal motion vector components of said candidate blocks other than said at least one field coded candidate macroblock, if any, and said at least one corresponding averaged horizontal motion vector component; and means for averaging the respective first and second field vertical motion vector components of the at least one field coded candidate macroblock to obtain at least one corresponding averaged vertical motion vector component; wherein:

said vertical motion vector component used in differentially encoding said vertical motion vector components of said first and second fields of said current field coded macroblock is determined according to a median of the vertical motion vector components of said candidate blocks other than said at least one field coded candidate macroblock, if any, and said at least one corresponding averaged vertical motion vector component.

49. The apparatus of claim 48, wherein:

the first and second field horizontal motion vector components of the at least one field coded candidate macroblock are averaged such that all fractional pixel offsets are mapped to a half-pixel displacement; and the first and second field vertical motion vector components of the at least one field coded candidate macroblock are averaged such that all fractional pixel offsets are mapped to a half-pixel displacement.

50. The apparatus of claim 40, wherein:

the horizontal motion vector component used in differentially encoding said horizontal motion vector component of said current block is determined according to a median of the horizontal motion vector components of said first, second and third candidate blocks; and the vertical motion vector component used in differentially encoding said vertical motion vector component of said current block is determined according to a median of the vertical motion vector components of said first, second and third candidate blocks.

51. The apparatus of claim 40, further comprising:

a decoder for decoding said candidate first, second and third blocks to recover said horizontal and vertical motion vector components associated therewith.

52. The apparatus of claim 40, further comprising:

means for recovering transmitted data with said at least one differentially encoded motion vector component indicating whether said current block is field coded.

53. The apparatus of claim 52, wherein:

said coding mode designates the motion vector components of one of said candidate first, second and third blocks as being the same as the motion vector components used in differentially encoding the motion vector components of said current block.

54. The apparatus of claim 40, wherein said digital video image comprises macroblocks which are processed row by row, further comprising:

means for processing said second and third macroblocks in said preceding row to recover said horizontal and vertical motion vector components associated therewith;

means for storing said horizontal and vertical motion vector components associated with said second and third macroblocks;

means for processing said first macroblock in said current row to recover said horizontal and vertical motion vector components associated therewith; and means for subsequently retrieving said horizontal and vertical motion vector components associated with said second and third macroblocks for use by said at least one of said means for determining.

* * * * *